(12) United States Patent
Blomeley

(10) Patent No.: US 8,511,603 B2
(45) Date of Patent: Aug. 20, 2013

(54) ROADABLE AIRCRAFT WITH COLLAPSIBLE WINGS AND DUCTLESS FAN

(76) Inventor: Lewis E. Blomeley, Albany, GA (US)

( * ) Notice: Subject to any disclaimer, the term of this patent is extended or adjusted under 35 U.S.C. 154(b) by 1002 days.

(21) Appl. No.: 12/687,118

(22) Filed: Jan. 13, 2010

(65) Prior Publication Data

US 2011/0036938 A1  Feb. 17, 2011

Related U.S. Application Data

(60) Provisional application No. 61/144,486, filed on Jan. 14, 2009.

(51) Int. Cl.
 *B64C 3/56* (2006.01)
 *B64C 39/04* (2006.01)
 *B60F 5/02* (2006.01)

(52) U.S. Cl.
 USPC ................................. 244/49; 244/2

(58) Field of Classification Search
 USPC ............ 244/2, 49, 123.8, 123.9, 218
 See application file for complete search history.

(56) References Cited

U.S. PATENT DOCUMENTS

| | | | | |
|---|---|---|---|---|
| 1,358,915 | A | * | 11/1920 | Amici ............................ 244/49 |
| 1,545,553 | A | * | 7/1925 | Dillingham .................... 244/49 |
| 1,793,056 | A | | 2/1931 | Carns |
| 1,889,255 | A | | 11/1932 | Leray |
| 2,572,421 | A | | 10/1951 | Abel |
| 2,812,911 | A | | 7/1953 | De Jean |
| 2,650,781 | A | | 9/1953 | Taylor |
| 2,659,781 | A | | 9/1953 | Taylor |
| 2,674,422 | A | | 4/1954 | Pellarini |
| 3,012,740 | A | | 12/1961 | Wagner |
| 3,056,564 | A | | 10/1962 | Zuck |
| 3,193,215 | A | | 7/1965 | Dunham |
| 3,525,483 | A | | 8/1970 | Van Alstyne |
| 3,576,300 | A | | 4/1971 | Pulfreyman |
| 3,599,901 | A | | 8/1971 | Relkin |

(Continued)

FOREIGN PATENT DOCUMENTS

| | | |
|---|---|---|
| EP | 0776821 | 4/1997 |
| EP | 0932548 | 8/1999 |

OTHER PUBLICATIONS

Instantaneous Behavior of Streamwise Vortices for Turbulent Boundary Layer Separation Control J. Fluids Eng.—Feb. 2007—vol. 129, Issue 2, 226 (10 pages).

(Continued)

*Primary Examiner* — Rob Swiatek
(74) *Attorney, Agent, or Firm* — Robert Platt Bell

(57) ABSTRACT

A roadable aircraft may be registered and driven as a motorcycle on the roadways, does not require that any parts be "left behind" at the airport when configuring to roadable use and does not require removing portions of the aircraft and towing them behind. A foldable and collapsible wing comprises a number of wing ribs, which are hinged to a main forward spar. To fold for road usage, the wing ribs fold about a hinge fitting to collapse against the wing spar. To maintain tension on the wing skin (to prevent flutter) tensioning bladder(s) may be used to keep the fabric taut. Once retracted and folded, the wings align with tail booms to form a compact and aerodynamic package. The ductless fan may be provided with a center-mounted extraction fan ducted to inlets along the fuselage to draw low energy air in toward the fuselage and thus prevent boundary layer separation.

20 Claims, 27 Drawing Sheets

(56) References Cited

U.S. PATENT DOCUMENTS

| | | | |
|---|---|---|---|
| 3,951,360 A | | 4/1976 | Anxionmaz |
| 5,240,203 A | * | 8/1993 | Myers .......................... 244/3.28 |
| D340,426 S | | 10/1993 | Miller |
| 5,417,391 A | | 5/1995 | Savitsky et al. |
| 5,730,393 A | | 3/1998 | Hatrick |
| 5,743,493 A | | 4/1998 | McCaughan |
| 5,775,249 A | | 7/1998 | Samuel |
| 5,899,416 A | | 5/1999 | Meister |
| 6,151,883 A | | 11/2000 | Hatrick |
| 6,390,418 B1 | | 5/2002 | McCormick |
| 6,527,224 B2 | | 3/2003 | Siedel |
| 6,899,302 B1 | | 5/2005 | Hassan |
| 7,097,133 B2 | * | 8/2006 | Elam .......................... 244/3.29 |
| 2002/0139894 A1 | | 10/2002 | Sorensen |

OTHER PUBLICATIONS

Boundary Layer Control as a Means of Improving Aircraft Maneuverability, Dianov, G. P.; Yatskov, N. A, Dianov, Sep 7, 1969.
Propulsion Systems: Basic Concepts, Undated http://adg.stanford.edu/aa241/propulsion/propulsionintro.html.
Aviation and the global atmosphere: a special report of IPCC Working Groups . . . By Joyce E. Penner, 1999, intergovernmental panel on climate change.
Aviation and the Global Atmosphere, Chapter 7, Intergovernmental Panel on Climate Change COP 6 in The Hague, Nov. 2000, published to web by GRID-Arendal in 2001.
Waterman Aerobile, Inventory No. A19610156000, circa 1957 http://collections.nasm.si.edu/code/emuseum.asp?style=expanded&currentrecord=1&page.
Looking back at Henry Ford's Flivver: A plane-car for the man of average means. By Bob Sillery, Posted Dec. 17, 2001 at 4:33 pm, www.popsci.com.
Hall Flying Car / Convair 118 1947, http://www.aviastar.org/air/usa/hall_flyingcar.php.
Aerocar Home Page, http://www.aerocar.com/ (c) 2002.
Taylor Aerocar—N4994P, circa 1949 http://museum.eaa.org/collection/aircraft/Taylor%20Aerocar.asp.
AVE Mizar, http://en.wikipedia.org/wiki/AVE_Mizar Nov. 11, 2009.
The StrongMibile Flying Car Project, 2009 http://www.strongware.com/dragon/.
LaBische Aerospace, Worlds Fastest Car http://www.labicheaerospace.com/.
Haynes Skyblazer http://www.haynes-aero.com/Netscape/frames.html.
Milner Motors, Transforming Transportation, circa 2005-2008 http://www.milnermotors.com/.
Moller International, (c) 2009 http://www.moller.com/.
Urban Aeronautics, Sep. 2009 http://www.urbanaero.com/Urban_Main.htm.
Terrafugia, It's time to make the Transition (c) 2008 http://www.terrafugia.com/.
MotoPOD LLC, Ground Transportation at Every Airport! 2009 http://www.motorcyclepilot.com/.
PAL-V 'Personal Air and Land Vehicle', Jan. 2009 http://www.pal-v.com/.
AeroCycle, Don't just get there, be there, undated http://www.wolf-faerocycle.com/.
Welcome to Samson Motorworks, (c) 2008-2009 http://www.samsonmotorworks.com/.
Parajet Skycar (c) 2009 http://www.parajetautomotive.com/.

* cited by examiner

Ref. Detail A of Fig. 10

Ref. Section C-C of Fig. 11

Section D - D

Ref. Detail B of Fig. 10

Ref. Section E-E of Fig. 21

ROADABLE AIRCRAFT WITH COLLAPSIBLE WINGS AND DUCTLESS FAN

CROSS-REFERENCE TO RELATED APPLICATIONS

The present application claims priority from Provisional U.S. Patent Application No. 61/144,486 filed on Jan. 14, 2009, and incorporated herein by reference.

FIELD OF THE INVENTION

The present invention relates to a roadable aircraft. In particular, the present invention is directed toward an aircraft, which is roadable, with attached collapsible wings, which may be registered as a motorcycle, and which is propelled by a ductless fan in flight.

BACKGROUND OF THE INVENTION

Roadable aircraft are well known in the art. The flying car or roadable aircraft may be defined as a vehicle, which may legally travel on roads and can take off, fly, and land as an aircraft. In practice, the vehicle usually has to be converted from a standard fixed-wing aircraft to one with sufficient roadworthiness. However, in the long history of roadable aircraft, there has yet to be one design, which has met with any significant commercial success or adaptation.

Aviation pioneer Glenn Curtiss was the first to design a flying car. However, the first flying car to actually fly successfully was built by Waldo Waterman. Waterman became associated with Curtiss while Curtiss was pioneering naval aviation at North Island on San Diego Bay in the 1910s. However, it wasn't until Mar. 21, 1937 that Waterman's Aerobile first took to the air. The Aerobile was a development of Waterman's tailless aircraft, the Whatsit. It had a wingspan of 38 feet and a length of 20 feet 6 inches. On the ground and in the air, it was powered by a Studebaker engine. It could fly at 112 mph and drive at 56 mph. While an example of the Waterman Aerobile is now in the Smithsonian Air & Space museum, the design never became commercially successful.

In 1926, Henry Ford displayed an experimental single-seat airplane that he called the "sky flivver". The project was abandoned two years later when a test flight crashed, killing the pilot. While several designs (such as the Convair flying car and Molt Taylor's Aircar) have flown, none have enjoyed commercial success and those that have flown are not widely known to the general public.

FIG. 26 is a side view of the Aerocar, illustrating details of the design. The idea for the Aerocar occurred to its designer, Moulton (Molt) Taylor, in 1946. During a trip to Delaware he met inventor Robert E. Fulton, Jr., and became captivated by the concept of Fulton's roadable airplane, the Airphibian. Taylor immediately saw the weakness in the fixed, detachable wings of Fulton's design, and set about building his prototype Aerocar with folding wings, which he completed in 1949. After a successful demonstration flight, Molt promoted the Aerocar at aircraft and auto shows and on TV. As the flood of inquiries poured in, Molt raised money to certify the machine as an airplane, and to build four "pre-production" Aerocars for demonstrations and eventual sale.

The Aerocar is a two-place aircraft with side-by-side seating, four wheels, high, unobtrusive wings, and a single Lycoming 0-320 engine mounted over the rear wheels. The propeller is mounted at the end of a long tail cone, and the latter is angled up considerably, to provide adequate propeller clearance. Its cruise speed was 100 mph, and it initially sold for $25,000.

Aerocars represent the only FAA certified airplane in history that could also drive on the highways. Three other examples of the Model I still exist: N101D is now owned by Greg Herrick; N102D, once owned by TV host Bob Cummings, has been restored by Ed Sweeney in Black Forest, Colo.; N103D is no longer airworthy, but is owned by Mildred Felling in Grand Junction, Colo. Only one example of Model II was ever built. Now owned by Ed Sweeney, it featured tricycle landing gear and accommodated four people. Perhaps the most interesting Aerocar is the Model III. Like the Model I it has two seats and four wheels, but the wheels partially retract, thereby allowing a slightly faster cruise speed. While a number of the Aerocars were built, it was not a successful design in that it did not generate a profit or become widely adopted. The Aerocar remains more of a curiosity than a practical roadable aircraft.

While Molt Taylor did successfully build a roadable aircraft, the design has a number of technical limitations. The "car" portion of the design would never meet safety standards for automobiles today, and could not easily be made to meet such standards. In addition, to convert from flying car to roadable car required detachment of the tail and wings, as illustrated in FIG. 27. This arrangement was then towed behind the car as a single-wheel trailer configuration, which would make negotiating corners difficult, if not hazardous. The large wing surfaces, when placed in trailer configuration, would be hard to handle in crosswinds, particularly with such a lightweight "car" towing them. The long drive shaft used to connect to the tail mounted propeller also presented design and operation difficulties. It would be preferable to keep the power plant and propeller drive mechanism as compact as possible.

Another notable design, Henry Smolinski's Mizar, made by mating the rear end of a Cessna Skymaster with a Ford Pinto, disintegrated during test flights, killing Smolinski and the pilot. The pod-and-twin-boom configuration of the Skymaster was a convenient starting point for this hybrid automobile/airplane. The passenger space and front engine of the Skymaster were removed leaving an airframe ready to attach to a small car.

The Mizar was intended to use both the aircraft engine and the car engine for takeoff. This would considerably shorten the takeoff roll. Once in the air the car engine would be turned off. Upon landing the four-wheel braking would stop the craft in 525 feet or less. On the ground, telescoping wing supports would be extended and the airframe would be tied down like any other aircraft parked at the airport. The Pinto could be quickly unbolted from the airframe and driven away.

On Sep. 11, 1973, during a test flight at Oxnard, Calif., the right wing strut detached from the Pinto. Some reports say the wings folded and others say the Pinto separated from the airframe. Smolinski and the pilot, Harold Blake, were killed in the resulting fiery crash. Even though the Pinto was a light car, the total aircraft was already slightly over gross weight without passengers or fuel.

The Mizar illustrates one problem with trying to make a roadable aircraft from an automobile. Even with a detachable wing and engine structure, the overall aircraft weight is so high as to make the design impractical. As safety requirements for automobiles have increased over the years (side impact, 2.5 mph bumpers, air bags, air curtains, rollover protection, and the like) and emissions requirements have increased, the overall weight of even the smallest automobile in the United States has increased. Building attachable wings to an automobile frame is therefore not a practical solution for a roadable aircraft, due to weight considerations. In addition, requiring the user to detach wings and engine and leave them at an airport would limit the aircraft/automobile concept in use, as the pilot/driver would have to return to the airport where he left his wing/engine pod in order to take off again.

In the 1950s, Ford Motor Company performed a serious feasibility study for a flying car product. They concluded that such a product was technically feasible, economically manufacturable, and had significant realistic markets. The markets explored included ambulance services, police and emergency services, military uses, and initially, luxury transportation. Light helicopters now serve some of these markets.

When Ford approached the U.S. Federal Aviation Administration (FAA) about regulatory issues, the critical problem was that the (then) known forms of air traffic control were inadequate for the volume of traffic Ford proposed. At the time, air traffic control consisted of flight numbers, altitudes and headings written on little slips of paper and placed in a case. Quite possibly computerized traffic control, or some form of directional allocation by altitude could resolve the problems. In addition, the cost of certifying such an aircraft would be prohibitive, so Ford dropped the project.

Since that time period, a number of aviation developments have made the concept of the roadable airplane more attractive. While regulations concerning automobiles are extremely stringent and result in large weight penalties, motorcycles, defined generally as any vehicle with three wheels or less, are subject to much less government regulation and are considerably lighter on construction. Three-wheeled vehicles such as the Corbin Sparrow have been promoted as high-mileage alternatives to the traditional automobile, and may be registered as motorcycles in most States, eliminating the need for heavy and cumbersome safety and emissions gear.

In addition, the new Light-Sport Aircraft Standard recently promulgated by the FAA makes it easier to develop smaller aircraft without having to go through the tortuous process of FAR 23 certification. The Light-Sport Aircraft Standard also makes it easier to casual pilots to become registered with a Sport Pilot certificate, as opposed to the traditional and more expensive private pilot licensing process.

The Federal Aviation Administration defines a light-sport aircraft as an aircraft with a maximum gross takeoff weight of not more than 1320 pounds (600 kilograms) for aircraft not intended for operation on water; or 1,430 pounds (650 kilograms) for aircraft intended for operation on water; a maximum airspeed in level flight of 120 knots (222 km/h); a maximum stall speed of 45 knots (83 km/h); either one or two seats; fixed undercarriage and fixed-pitch or ground adjustable propeller; and a single electric motor or reciprocating engine, which includes diesel engines and Wankel engines.

Aircraft which qualify as LSA may be operated by holders of a Sport Pilot certificate, whether they are registered as Light Sport Aircraft or not. Pilots with a private, recreational, or higher pilot certificate may also fly an LSA, even if their medical certificates have expired, so long as they have a valid driver's license to prove that they are in good enough health to fly. LSA also have less restrictive maintenance requirements and may be maintained and inspected by traditionally certificated Aircraft Maintenance Technicians, by individuals holding a Repairman: Light Sport certificate, and (in some cases) by their pilots and/or owners.

In addition, new aircraft routing techniques are envisioned to make it easier to route aircraft and reduce the likelihood of collisions, without having to rely upon cumbersome manual flight guidance techniques. The future of U.S. aviation is the Next Generation Air Transportation System, or NextGen. In the 21st century, the growing global demand for aviation, development of new airborne vehicles, and security and environmental concerns, are going to require a new kind of airways system.

NextGen is a wide-ranging transformation of the entire national air transportation system—not just certain pieces of it—to meet future capacity demands and avoid gridlock in the sky and at airports. State-of-the-art technology, such as Automatic Dependent Surveillance, Mode B (ADS-B), multilateration, GPS guidance, and the like, along with new procedures, and new airport infrastructure will allow the U.S. Federal Aviation Administration (FAA) to safely handle dramatic increases in the number and type of aircraft, without being overwhelmed by congestion. NextGen is a curb-to-curb transformation of the U.S. air transportation system. This transformation involves going from today's ground-based, human-dependent communications, navigation, and surveillance system to one that takes advantage of satellite navigation and surveillance, digital communications and advanced networking. It shifts some decision-making from the ground to the cockpit.

As a result of all these changes, the possibility of implementing a true roadable aircraft are stronger than ever, provided such an aircraft can be made which is lightweight, compact, easy to use, and has attached wings and structure (as opposed to detachable wings) such that conversion from flying aircraft to roadable aircraft can be accomplished in minutes (as opposed to hours) and the resulting roadable aircraft be compact and easily driven.

Partially as a result of all these changes, a number of contemporary designs are presently being developed or proposed. Today, there is an active movement in the search for a practical flying car. Several conventions are held yearly to discuss and review current flying car projects. Two notable events are the Flying Car forum held at the world-famous EAA Airventure at Oshkosh, Wis., and the Society of Automotive Engineers (SAE) conventions held at various cities. A number of companies are developing vehicles.

Terrafugia, a private company, is developing the Transition, a roadable aircraft that the company describes as a "Personal Air Vehicle". The aircraft is designed to change configurations, enabling it to operate as a traditional road vehicle and as a Light Sport Aircraft. The estimated purchase price is $148,000. Owners will drive the car from their garage to an airport where they will then be able to fly within a range of 100 to 500 miles. It will carry two people plus luggage and will operate on premium-unleaded gas.

The Transition, as of this date, has successfully completed almost 30 flights and is expected to be certificated as a Light Sport Aircraft sometime in 2011. The wings are hinged at the root and mid semi-span and fold upwards against the fuselage for road use. If successfully certificated, the Transition will be a significant step toward the roadable airplane reaching its potential. With a highway speed of 65 mph and airspeed of 115 mph, however, the Transition is only practical for relatively short commutes, and the wind sensitive folded wings make it unsuitable for driving on expressway. These limitations hinder its utility considerably, and may thus limit its commercial viability as well.

Retired Air Force pilot-engineer Rich Strong developed the StrongMobile Magic Dragon Aircar over a 50-year period. The design uses an automobile-type lifting body fuselage and automotive suspension. Flight propulsion uses a front-mounted ducted fan with side outlets. Automatic conversion uses a combination of folding and swinging to stow the wings into the body. The current design envisions a core market of frequent regional business travelers whose timesavings make using the StrongMobile virtually revenue neutral.

LaBiche Aerospace's FSC-1 is a developmental prototype Flying Car and is an example of a practical flying car capable of utilizing today's automotive and aviation infrastructure to provide true "door-to-door" travel. The vehicle can be parked in any garage or parking space available for cars. The FSC-1, like the Transition, will be capable of automatic conversion from aircraft to car at the touch of a button. LaBiche has flown a 1/10th scale model, tested a 1/4-scale model and, as of 2006, was finishing the FSC-1 prototype for road and flight tests. Currently, the FSC-1 requires a pilot and driver's license to operate. However, upon approval from the FAA, development is underway for utilizing a new satellite-navigation "hands free" flight system to travel from airport to airport that will eliminate the need for a pilot's license. Numerous safety systems and fail-safes are also employed on the FSC-1, such as a recovery parachute.

The Haynes Aero Skyblazer is a development stage vehicle that uses a single turbofan engine to provide thrust in the air and to generate electricity to power electric motors for ground travel. In "car mode", a patented mechanism allows the wings to fold into the body of the vehicle, which is designed to fit into a single car garage and regular parking space. In "aircraft mode" the vehicle will have STOL capabilities and be able to use almost any public-use airfield. It is expected to have a top speed of 400 mph (640 km/h) and a range of 830 miles (1,340 km). The Skyblazer team has completed wind tunnel, stability and control testing and flown a 1/6th scale model.

The Milner AirCar is an advanced composite four-door, four-passenger roadable aircraft (flying car) with foldable main wing at the rear and foldable canard in the front. The AirCar has a wingspan of 28 ft (8.5 m), maximum gross weight of 3,000 lb (1,400 kg) and a total of 300 hp (220 kW) from dual ducted fans. Cruise airspeed and range are expected to be 200 mph (322 km/h) for 1,000 miles (1,600 km). After landing the wings fold to a width of 7 ft (2.1 m) so the vehicle can drive on public roads. A drive-able, but non-flyable prototype is complete.

The Moller Skycar M400 is a prototype personal VTOL (vertical take-off and landing) aircraft that some refer to as a flying car, although it cannot be driven as an automobile. However, the Skycar is a good demonstration of the technological barriers to developing the VTOL flying car. Moller International continues to develop the Skycar M400, which is powered by four pairs of tandem Wankel rotary engines, and is approaching the problems of satellite-navigation. Moller also advises that, currently, the Skycar would only be allowed to fly from airports & heliports. Moller has been developing VTOL craft since the late 1960s, but no Moller vehicle has ever achieved free flight out of ground effect. Macro Industries Skyrider is a prototype of a flying car developed by Macro industries, which is similar to the Moller Skycar except lighter Urban Aeronautics' X-Hawk is a VTOL aircraft, which operates much like a tandem rotor helicopter, however it doesn't have the exposed rotors, which make helicopters dangerous for personal use. This is accomplished by containing the rotors in large 'ducts', which make up most of the body of the craft; the requisite decrease in rotor size also decreases fuel efficiency. The X-Hawk is being promoted for rescue and utility functions. It is expected to be available for about $3 million around 2010.

MotoPOD LLC advocates the combined use of airplanes and motorcycles to achieve door-to-door transportation. The company has developed a Motorcycle Pod that allows pilots to carry a street-legal motorcycle beneath their airplane. After landing, it takes only a few minutes to remove the motorcycle, unfold the handlebars and ride away. The company believes this modular solution will appeal to pilots who currently enjoy airplanes and motorcycles separately.

PAL-V Europe BV: the PAL-V ONE is a hybrid of a gyrocopter with a car. It has three wheels and a top speed of 124 mph on land and air. It can run on gasoline, biodiesel or bio-ethanol and will cost $75 000. The vehicle has a very short take of and vertical landing capability. At less than 70 decibels it is quieter than a helicopter due to the slower rotation of the main rotor. The PAL-V ONE has only one seat.

The Wolff AeroCycle is a motorcycle that can have the airplane parts attached in order to fly, and then detached to drive on the road.

The SkyBike, by SAMSON MOTORWORKS LLC is a three-wheel concept with telescoping wings. First introduced at AirVenture 2008, the SkyBike is to utilize a single Wankel rotary engine and ducted fan to keep the propeller out of harms way on the ground. The wheels and propeller are to be powered by the same engine, but wheel-power only to be utilized on the ground. Development is ongoing at Swift Engineering of San Clemente, with flying prototype targeted for 2009. A predicted top speed of 110 mph on the ground is nearly as fast as the anticipated 130 mph in the air. No parts are left at the airport after conversion from aircraft to ground vehicle, as the main wing and tail retract into the vehicle body. The vehicle leans into the turns on the ground, to impart the feeling of being 'flown' on the ground as well.

While the use of telescoping wings seems to solve many of the problems of the Prior Art, it is unclear whether such wings can be made strong and light enough to practical use. Note the use of the entirely shrouded ducted fan, which appears to solve at least some of the propulsion problems of the Molt Taylor Skycar previously discussed. It is unclear whether such a fan could generate sufficient propulsion to fly the aircraft, given the extensive ducting and shrouding of the fan. In addition, with the use of such a relatively short fuselage, the issue of boundary layer separation when using a ducted fan is an issue. Note also the lack of tail surfaces for this design, which raises some stability issues.

The Parajet Skycar utilizes a paramotor for propulsion and a parafoil for lift. The main body consists of a modified dune buggy. It has a top speed of 80 mph and a maximum range of 180 miles in flight. On the ground it has a top speed of 112 mph and a maximum range of 249 miles. Parajet intends to fly and drive its prototype from London to Timbuktu in January 2009.

In order to be successful in the marketplace, a modern roadable aircraft should meet the following criteria:
  The wings and power plant should remain attached to the vehicle in roadable mode, so that no parts are "left behind" at the airport.
  When in roadable mode, the wings and fuselage should present a low profile to minimize the effect of crosswinds and the like.
  The vehicle should be lightweight so that it may possibly registered as a Light-Sport Aircraft, in order to reduce regulatory hurdles and make it easier to become licensed to fly.
  It should have fewer than four wheels, so that it may be registered as a motorcycle on the road, reducing the amount of Federal regulations required to certify such a vehicle for road use.
  It should use the same power plant for road use as for flying use, to reduce weight and complexity.

There are a number of Patents relating to roadable aircraft as well as foldable wing designs and ducted propeller designs.

Samuel, U.S. Pat. No. 5,775,249, issued Jul. 7, 1998, and incorporated herein by reference, discloses an inflatable sail for a sailboat. Although this Patent is directed toward a sailboat sail, the principles of airfoil design for aircraft may also be applied to sailboats. The internal structure is described as being either flexible or rigid, and the external covering is described in one embodiment as a solid plastic. It appears that the lateral ribs of Samuels (running the length of the wing) would prevent folding of the wing for storage. While the wing is discussed as having "inflatable" panels, no mention is made of how to maintain tension on the sailcloth.

Van Alstyne, U.S. Pat. No. 3,525,483, issued Aug. 25, 1970, and incorporated herein by reference, discloses a foldable panel for spacecraft use. The structure of this panel is not directed toward an airfoil.

Abel, U.S. Pat. No. 2,572,421, issued Oct. 23, 1951, and incorporated herein by reference, discloses a folding wing construction for an aircraft. This Patent appears to be relevant as background only, as it shows only a conventional folding and rotating wing well known in the art.

Pellarini, U.S. Pat. No. 2,674,422, issued Apr. 6, 1954, and incorporated herein by reference, discloses a folding wing construction for a roadable aircraft. This Patent appears to be relevant as background only, as it shows only a conventional folding and rotating wing well known in the art, as applied to a roadable aircraft.

De Jean, U.S. Pat. No. 2,812,911, issued Jul. 30, 1953, and incorporated herein by reference, discloses a folding wing construction for an aircraft. This Patent appears to be relevant as background only, as it shows only a conventional folding and rotating wing well known in the art.

Miller, U.S. Design Pat. No. D340,426, issued Oct. 19, 1993, and incorporated herein by reference, shows a folding wing construction for a roadable aircraft. This Patent appears to be relevant as background only, as it shows only a conventional folding and rotating wing well known in the art, as applied to a roadable aircraft.

Cams, U.S. Pat. No. 1,793,056, issued Feb. 17, 1931, and incorporated herein by reference, discloses a folding wing construction for an aircraft. This Patent appears to be relevant as background only, as it shows only a conventional folding and rotating wing well known in the art.

Zuck, U.S. Pat. No. 3,056,564, issued Oct. 2, 1962, and incorporated herein by reference, shows a folding wing construction for a roadable aircraft. This Patent appears to be relevant as background only, as it shows only a conventional folding and rotating wing well known in the art, as applied to a roadable aircraft.

McCaughan, U.S. Pat. No. 5,743,493, issued Apr. 28, 1998, and incorporated herein by reference, discloses boundary layer control in aerodynamic low drag structures. This particular boundary lawyer control is used in a jet engine nacelle. Inlet ducts are used to draw air from a fuselage or other surface to maintain boundary layer control. As such, McCaughan is no more than general background art on the use of inlets on an aircraft surface to control boundary layer separation.

Seidel, U.S. Pat. No. 6,527,224, issued Mar. 4, 2003, and incorporated herein by reference, discloses a separate boundary layer engine inlet. This Patent, assigned to Boeing, illustrates a futuristic lifting body aircraft design that Boeing has used in advertisements and promotions. Fan inlets are located in a wide horizontal slot on the upper surface of the lifting body, while engine core inlets are located above these slots.

Wagner, U.S. Pat. No. 3,012,740, issued Dec. 12, 1961, and incorporated herein by reference, shows a complicated aircraft boundary layer control system using a series of controllable suction and blowing ducts to control boundary layer air flow on wing control surfaces. This reference shows little more than controlling boundary layer airflow using ducting and airflow is known in the art. This reference has particular application to control surfaces, not to fuselage or other surfaces.

Anxionnaz, U.S. Pat. No. 3,951,360, issued Apr. 20, 1976, and incorporated herein by reference, discloses a device for regulating and recovering the boundary layer over the surface of an aircraft. This is another cumulative reference showing the use of ducting and slots to draw air in from a surface to control boundary layer separation.

Dunham, U.S. Pat. No. 3,193,215, issued Jul. 6, 1965, and incorporated herein by reference, discloses an aerodynamically designed amphibious vehicle. This is another cumulative reference showing the use of ducting and slots to draw air in from a surface to control boundary layer separation.

Hatrick et al., U.S. Pat. No. 5,730,393, issued Mar. 24, 1998, and incorporated herein by reference, discloses an aircraft propulsive power unit Like the McCaughan reference (also assigned to Short Brothers, PLC) this reference is related to jet engine nacelles. However in this Hatrick device, the goal is to disrupt the boundary layer.

Pulfreyman, U.S. Pat. No. 3,576,300, issued Apr. 27, 1971, and incorporated herein by reference, discloses a lifting body aircraft design Like the Boeing reference above, this design uses rear-mounted engines to draw the boundary layer in from the top of the lifting body.

Meister, U.S. Pat. No. 5,899,416, issued May 4, 1999, and incorporated herein by reference, discloses a rudder assembly with boundary layer control. This is another cumulative reference showing the use of ducting and slots to draw air in from a surface to control boundary layer separation.

Relkin, U.S. Pat. No. 3,599,901, issued Aug. 17, 1971, and incorporated herein by reference, discloses a vehicle for land or air travel, which is relevant as background only.

Pradip, Published European Patent Document EP 0776821, incorporated herein by reference, discloses boundary layer control for aircraft wings. This is another cumulative reference showing the use of ducting and slots to draw air in from a surface to control boundary layer separation.

Savitsky et al., U.S. Pat. No. 5,417,391, issued May 23, 1995, and incorporated herein by reference, discloses a method to control the boundary layer on an aircraft. This is another cumulative reference showing the use of ducting and slots to draw air in from a surface to control boundary layer separation.

Hatrick, U.S. Pat. No. 6,151,883, issued Nov. 28, 2000, and incorporated herein by reference, is another Short Brothers Patent directed toward thrust reversing and is deemed of limited relevance.

Taylor, U.S. Pat. No. 2,659,781, issued Sep. 1, 1953, and incorporated herein by reference, discloses boundary layer control for an aircraft. This is another cumulative reference showing the use of ducting and slots to draw air in from a surface to control boundary layer separation.

Hassan, U.S. Pat. No. 6,889,302, issued May 31, 2005, and incorporated herein by reference, discloses a method for altering boundary layer characteristics. This is another cumulative reference showing the use of ducting and slots to draw air in from a surface to control boundary layer separation.

McCormick, U.S. Pat. No. 6,390,418, issued May 21, 2002, and incorporated herein by reference, discloses a tangentially directed acoustic jet controlling boundary layer. This reference is of interest as background only. It appears to use audio speakers to direct an acoustic "jet" into the airflow.

Leray, U.S. Pat. No. 1,889,255, issued Nov. 29, 1932, and incorporated herein by reference, discloses a rotorplane. This fantastic design is clearly not practical. In one of his many embodiments, Leray discloses placing a "sucking fan" 70 into the hub of a propeller. However, this sucking fan appears to be gear driven from the propeller shaft and is very small in size. Moreover, Leray does not disclose using such a sucking fan to draw air from the fuselage of the aircraft to control boundary layer separation.

Kelley-Wickemeyer, Published European Patent Document EP 0932548, published Jan. 22, 2003, and incorporated herein by reference, discloses an aircraft with an unswept slotted cruise wing airfoil. This is another cumulative reference showing the use of ducting and slots to draw air in from a surface to control boundary layer separation.

Sorenson, Published U.S. Patent Application 2002/0139894, published Oct. 3, 2002, and incorporated herein by reference, discloses a roadable aircraft boat. This is another fantastic design, which does not seem practical. While Sorensen shows ducting drawing air in from the surface of the fuselage, it does not appear he is doing so to control boundary layers for a pusher prop design. Thus, it appears this reference is relevant as background only.

SUMMARY OF THE INVENTION

The present invention comprises a roadable aircraft which may be registered and driven as a motorcycle on the roadways and may also be flown as one or more of an Experimental Home Built, Light-Sport Aircraft, or Certified FAR 23 Aircraft. The roadable aircraft of the present invention does not require that any parts be "left behind" at the airport when configuring to roadable use. Moreover, it does not require removing portions of the aircraft and towing them behind. While there are a number of points of novelty in the present invention, two main features are a novel foldable and collapsible wing and a ductless fan with a center-mounted extraction fan to maintain boundary layer attachment without resorting to a long fuselage.

The foldable and collapsible wing of the present invention comprises a number of wing ribs, which are hinged to a main forward spar. To store for road usage, the wing ribs fold about a hinge to collapse against the wing spar. The wing skin is made of a flexible material, such as sailcloth (e.g., Nylon or Kevlar reinforced sailcloth or the like), which is more flexible than traditional doped wing fabrics and can collapse along with the wing ribs. The sailcloth may be configured as a tubular sleeve, which may wrap around the wing ribs and guides attached to the rib hinges. To maintain tension on the wing skin (to prevent flutter) a novel tensioning bladder or bladders may be used to maintain tension on the wing skin to keep the fabric taut. Once retracted and folded, the wings align with tail booms to form a compact and aerodynamic package, which provides low resistance to cross winds and the like.

A ductless fan is used to propel the aircraft in the air. The "ductless" fan is similar to ducted fans in operation, but eliminates the complex and heavy ducting of the ducted fan. The shroud enclosing the ductless fan is integral to it, rather than separate as in a ducted fan. There is no relative motion between the fan blades and shroud, so the space between the blade tip and shroud is nil. This minimizes blade tip losses even better than a ducted fan, without the complexity and weight and drag penalties. In its simplest embodiment, the ductless fan would be fitted with a central aft facing fairing (spinner) that would help reduce base drag on the aft fuselage. The ductless fan is ideally suited to aircraft configurations requiring a minimum diameter means of propulsion.

This "ductless" fan may be coupled to a transmission and driven by the same engine as used for road power. In one embodiment, a Subaru® opposed-cylinder automotive engine is employed, suitably modified for aircraft use. Such engines are commonly used in Experimental Home Built category aircraft, and thus modification techniques for converting such engines for aircraft use are well known in the art. Such engines are readily available and have a history of reliable use in aircraft. An existing transmission and transfer case may be used to drive the road wheels, with the transfer case, ordinarily used to drive the other set of wheels of a 4 wheel drive vehicle, used to power the ductless fan when in the air. In this manner, the driveline can be constructed at minimal cost, using existing components, many of which have already been used in aircraft applications. When converting from flying to road use, the ducted fan may be disengaged for safety reasons. For flying use, the road wheels may be engaged to shorten takeoff runs and then may be left engaged or disengaged when airborne.

The ductless fan of the present invention may be provided with a center-mounted extraction fan in place of the central spinner. This center-mounted extraction fan may be ducted to inlets along the fuselage to draw air into the fuselage and thus prevent boundary layer separation. When using a short fuselage, such as for a pusher configuration aircraft, boundary layer separation may be a concern, as the short pusher fuselage results in abrupt taper and may promote separation of the boundary layer. This separation causes turbulence and resultant excess drag and which may lead to inefficient use of a pusher propeller or fan. By providing the central extraction fan, which may be driven from the main ducted rotor or through a separate transmission, air may be drawn into the fuselage through ports, ducts or slots, and then pushed out though the central extraction fan. This arrangement would not only prevent boundary layer separation but would eliminate the base drag of the propeller hub, and possibly even add thrust.

It should be noted that the various components of the present invention may be used alone or in combination, and may also be applied to other technologies. For example, the folding wings of the present invention may be used in a roadable aircraft, but also may be applied to aircraft which fold for trailering or for storage, or to deploy in flight (e.g., air-dropped) or for shipping purposes or the like. The folding wing of the present invention may also be applied to sailboat airfoils and other airfoil applications as well.

Note also that while in the preferred embodiment, the aircraft of the present invention may be configured such that it may be converted from air use to road use without removing any components, the folding wings of the present invention may be made detachable for storage or to make the vehicle more roadable.

These and other features of the present invention will be described in more detail below in connection with the attached Figures.

DETAILED DESCRIPTION OF THE INVENTION

Figure 1:
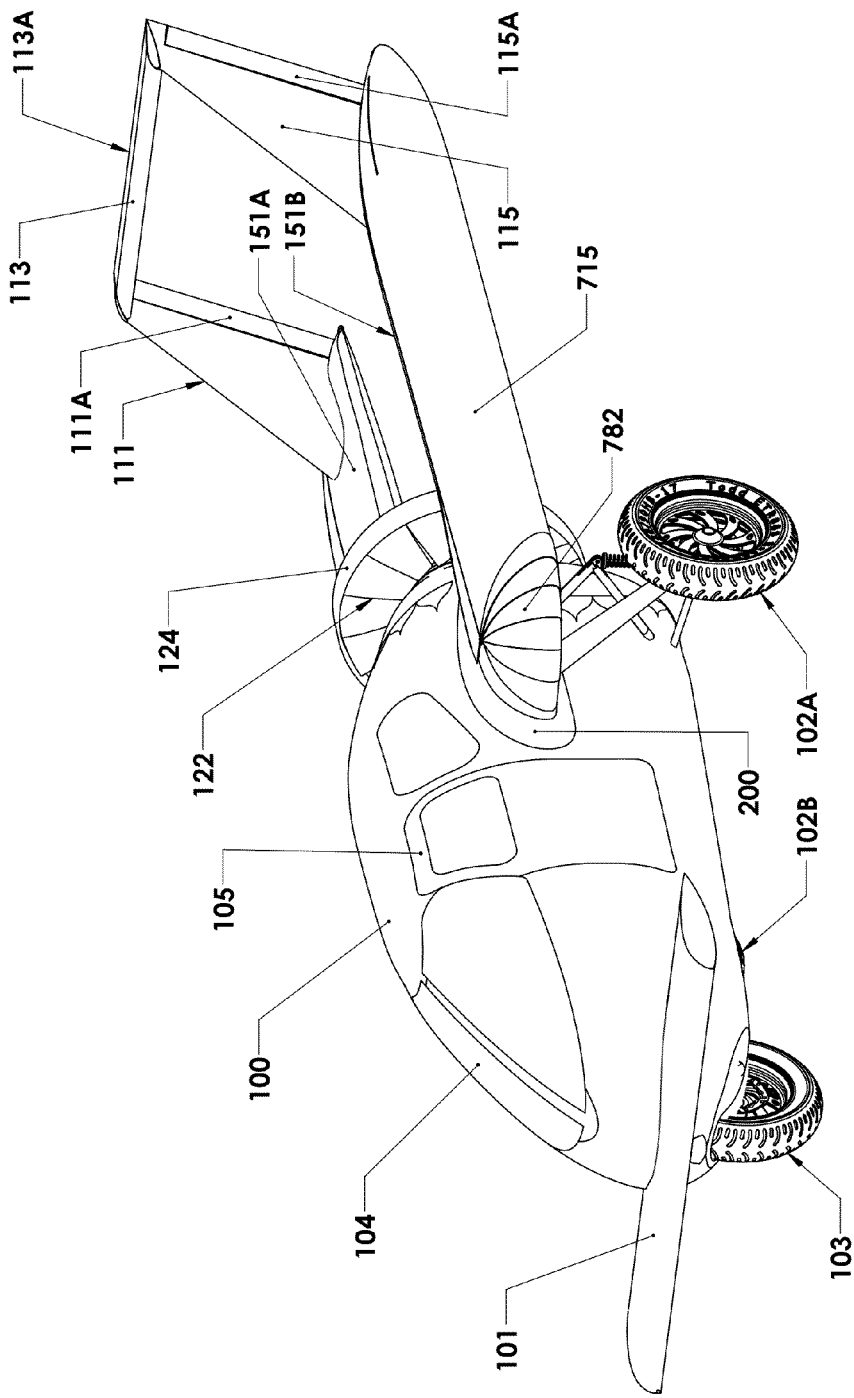
FIG. 1 is a front quarter perspective view of the roadable aircraft of the present invention, illustrated in a road-going configuration with wings collapsed and folded back for travel.
Figure 2:
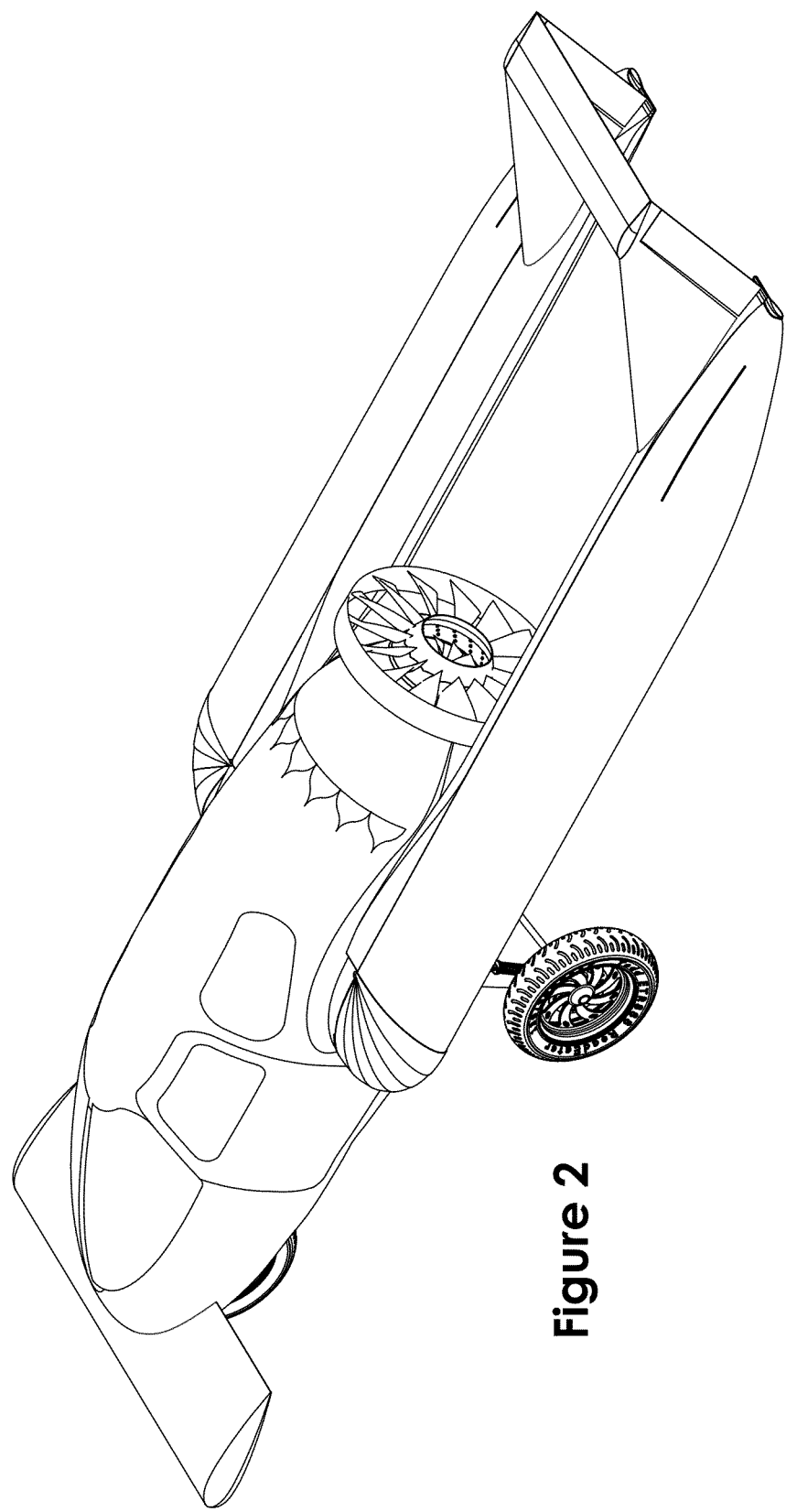
FIG. 2 is a rear quarter perspective view of the roadable aircraft of the present invention, illustrated in a road-going configuration with wings collapsed and folded back for travel and more clearly showing the ductless fan of the present invention.
Figure 5:
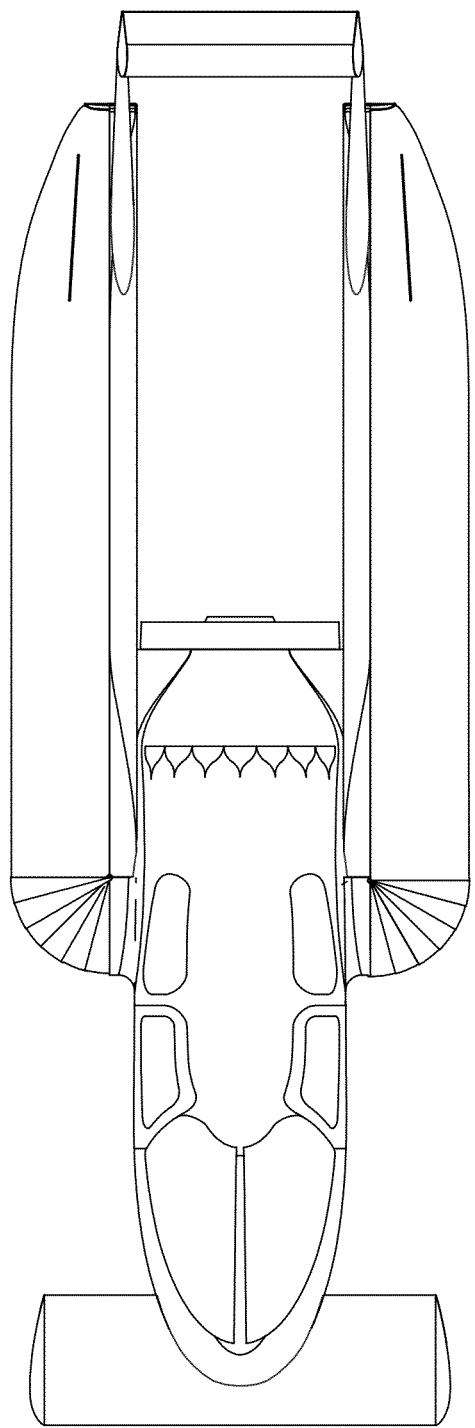
FIG. 5 is a top view of the roadable aircraft of the present invention, illustrated in a road-going configuration with wings collapsed and folded back for travel.

FIG. 1 is a front quarter perspective view of the roadable aircraft of the present invention, illustrated in a road-going configuration with wings collapsed and folded back for travel. FIG. 2 is a rear quarter perspective view of the roadable aircraft of the present invention, illustrated in a road-going configuration with wings collapsed and folded back for travel and showing more clearly the ductless fan of the present invention. FIG. 5 is a front quarter perspective view of the roadable aircraft of the present invention, illustrated in a road-going configuration with wings collapsed and folded back for travel.

Referring to FIGS. 1 and 2, an overall view of the roadable aircraft in road-going configuration is presented. The roadable aircraft of the present invention comprises a fuselage 100, which may be made of composites, riveted aluminum, traditional tube and fabric techniques, or any combination thereof. In the preferred embodiment, fuselage shell may be made of composites such as fiberglass and/or carbon fiber while the primary structure is a welded steel truss. Fuselage 100 may include cockpit access door 105 and windscreen 104. In order to be successful as both a road-going vehicle and an aircraft, it is important that easy ingress and egress be provided for the vehicle. Canopy style cockpits and the like, while suitable for aircraft, may be impractical for road-going vehicle traffic. As can be seen from FIGS. 1 and 2, the cockpit door 105 allows for easy ingress and egress, in both road going and aircraft modes, with the front seat back folding forward as is common for two-door cars.

As illustrated in FIG. 1, the roadable aircraft of the present invention is provided with three wheels, front steering wheel 103 and rear drive wheels 102A and 102B. Wheels 102A, 102B, and 103 act both as landing gear and also road-going wheels. Since the roadable aircraft of the present invention has only three wheels, it may be certified and registered as a motorcycle in the United States, eliminating or reducing many safety and emissions requirements that would add considerable weight to an automobile-type vehicle. In addition, if the roadable aircraft of the present invention is sold as a kit or plans for the Experimental Home-Built class, it may also be registered as a home-built motorcycle in many States, which may eliminate some emissions requirements for commercially manufactured motorcycles, such as catalytic converters, which present both weight and heat issues.

Seating in fuselage 100 may comprise tandem seating, in order to reduce fuselage cross-section and thus improve aerodynamics. Note that since the roadable aircraft of the present invention may be registered as a motorcycle, the occupants may be required in many states to wear motorcycle helmets. Such helmets can be fitted with radio and intercom headsets and microphones to communicate within the aircraft and also with ground stations and other aircraft. Although illustrated as a tandem two-seater configuration, the roadable aircraft of the present invention may also be constructed in other configurations, such as six seat (2+2+2) four seat (2+2) or three seat (1+2) configurations without departing from the spirit and scope of the present invention.

Because of the increased weight of higher passenger capacity versions of the current invention, the wing area would necessarily have to be larger. This is accomplished by increasing wing span, wing chord, or both, which for the embodiment discussed hereafter could make the length or width of the roadable version such that it would be difficult or impossible to use some roads. This problem can be overcome, up to some undetermined seating capacity, by having the wings hinged both at the root and at approximately one-third span, and attached to the roof of the cabin. The leading edge fairing would hinge at approximately one-third span so that the trailing edges would meet each other rather than a boom. At the same time the root hinges would swing the folding leading edge fairings forward until the left and right folded leading edge fairings meet at the airplane centerline. Rather than having twin booms supporting the empennage, this embodiment would have a single boom serving that function. The ductless fan used with the herein illustrated embodiment would be located below the single boom, rather than between the twin booms, but would be of similar diameter in order to provide road clearance.

Steering wheel 103 may be steered using a traditional motorcycle type handlebar, which may be connected to flight control surfaces such as spoilers 125, rudders 111A and 115A and elevator 113A on the aircraft. Alternately, an aircraft-style control wheel or yoke or joystick may be used, which may control both steering wheel 103 as well as aircraft control surfaces. A fore-and-aft movement of the handlebar, control wheel, yoke or joystick would control the elevator while side-to-side motion would control the rudders and spoilers. In another embodiment, a control yoke or joystick may be used to control aircraft control surfaces in flight and a motorcycle handlebar or other control device may be used to control steering wheel 103. Optionally, steering wheel 103 may be locked in place for flight or take-off, or may be castored for takeoff, depending on braking or other means for directional control during takeoff roll.

As illustrated in FIGS. 1 and 2, the wings of the aircraft are both folded and retraced flush with tail booms 151A and 151B, which extend back from wing root portion 200 of fuselage 100. Leading edge of 715 each wing folds flush along tail booms 151A and 151B to provide a clean and aerodynamic shape. A retractable segmented fairing 782 may be used, as will be detailed below, to provide a smooth aerodynamic surface, and also cover the forward end of leading edge 715 when retracted. Tail booms 151A and 151B may terminate in vertical tail surfaces 111 and 115 respectively, which may be connected by horizontal stabilizer 113. An optional canard 101 may be provided for additional lift, as well as possible trim and/or control use. Airborne propulsion may be provided by ductless fan 122 which may be provided with integral peripheral ring 124. In road-going mode, ductless fan 122 may be disengaged.

Ducted fan 122 is used to propel the aircraft in the air. Ductless fan 122 may be coupled to a transmission and driven by the same engine as used for road power. In one embodiment, a Subaru® opposed-cylinder automotive engine is employed, suitably modified for aircraft application. Such engines are commonly used in Experimental Home Built category aircraft, and thus modification techniques for converting such engines for aircraft use are well known in the art. Such engines are readily available and have a history of reliable use in aircraft. An existing transmission and transfer case may be used to drive the road wheels, with the power take-off, ordinarily used for four wheel drive or all wheel drive in an automobile, used to power the ductless fan when in the air. In this manner, the driveline can be constructed at minimal cost, using existing components, many of which have already been used in aircraft applications. When converting from flying to road use, the ducted fan may be disengaged, and possibly feathered, for safety reasons. For flying use, the road wheels may be engaged to shorten takeoff runs and then may be left engaged or disengaged when airborne.

Figure 27:
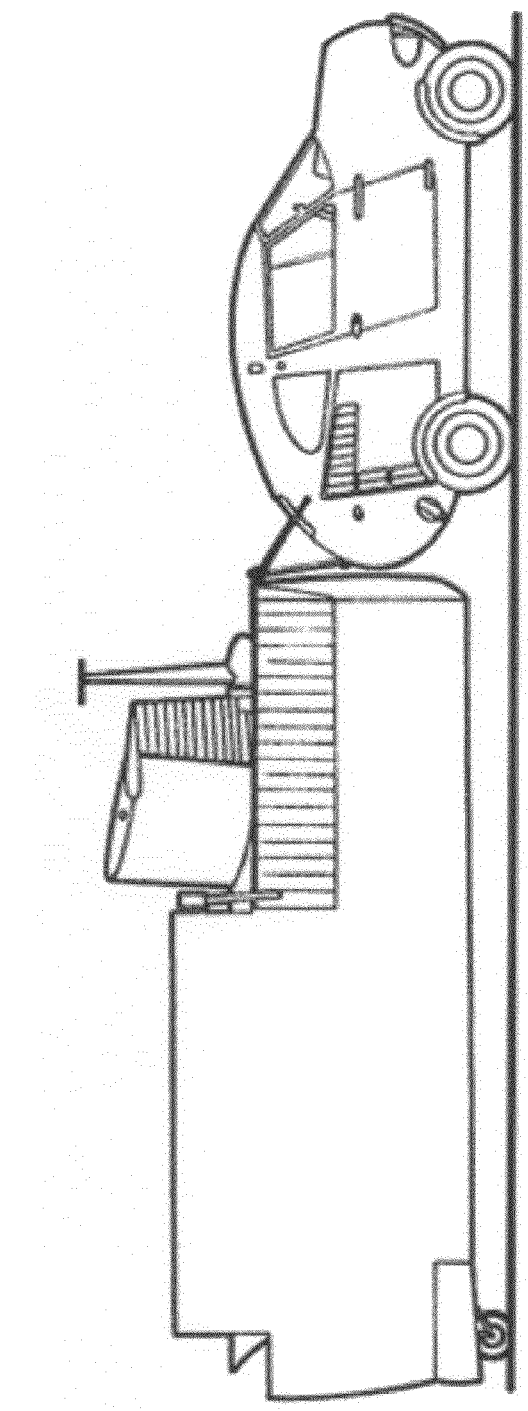
FIG. 27 is a side view of the Molt Taylor Aerocar of the Prior Art, illustrating the vehicle configured for road travel.

Comparing FIGS. 1, 2, and 5 with Prior Art FIG. 27, several improvements are noticeable. In the Prior Art FIG. 27, the wings need to be completely detached and towed behind the vehicle, whereas in the present invention, the wings fold back along the tail booms 151A and 151B. As such, the vehicle can switch from air mode to road mode more quickly. Note also that in Prior Art FIG. 27, the wings are towed in a vertical position, presenting a significant surface to side winds. Given the lightweight construction of most aircraft, it is evident that the Prior Art design of FIG. 27 would present some difficult handling characteristics on a roadway in crosswinds or when being passed by a truck or bus. The roadable aircraft of the present invention, when compared to Prior Art FIG. 27 is more compact and aerodynamic in road-going mode.

Figure 3:
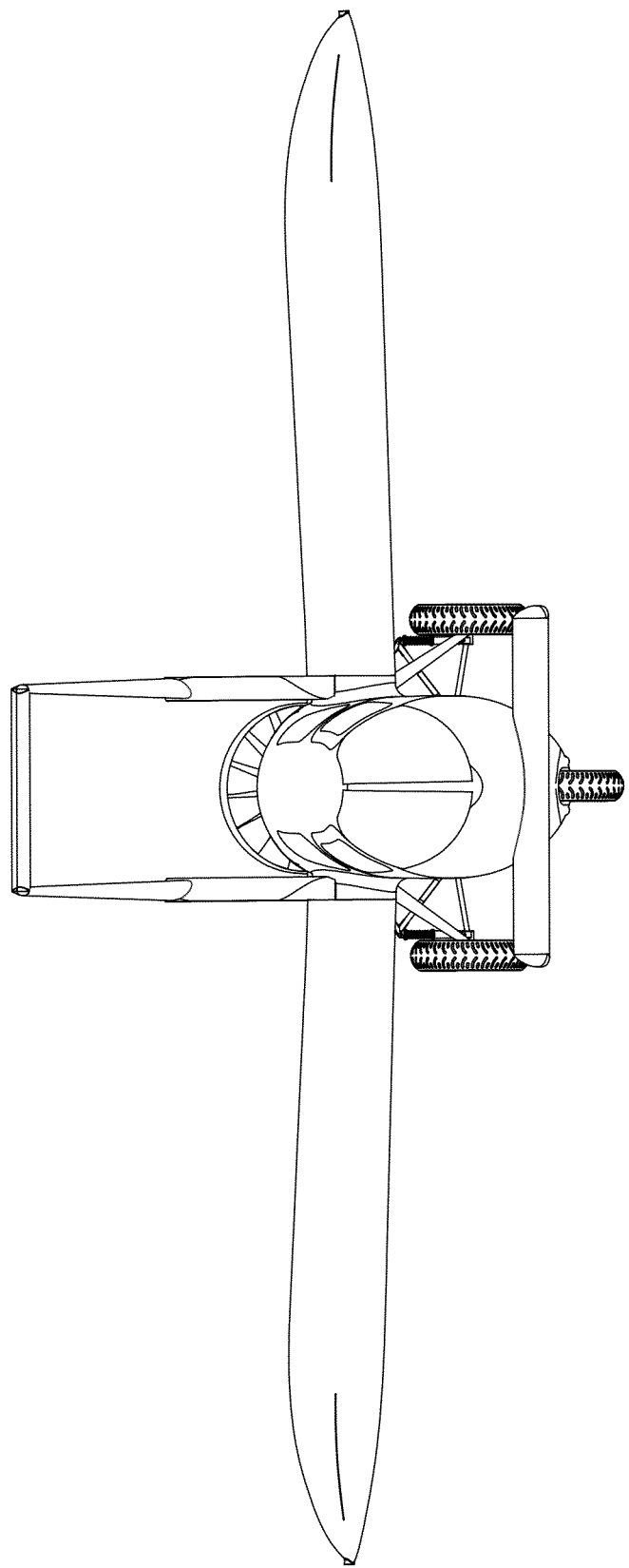
FIG. 3 is a front perspective view of the roadable aircraft of the present invention, illustrating the wings extended and folded out for flight.
Figure 4:
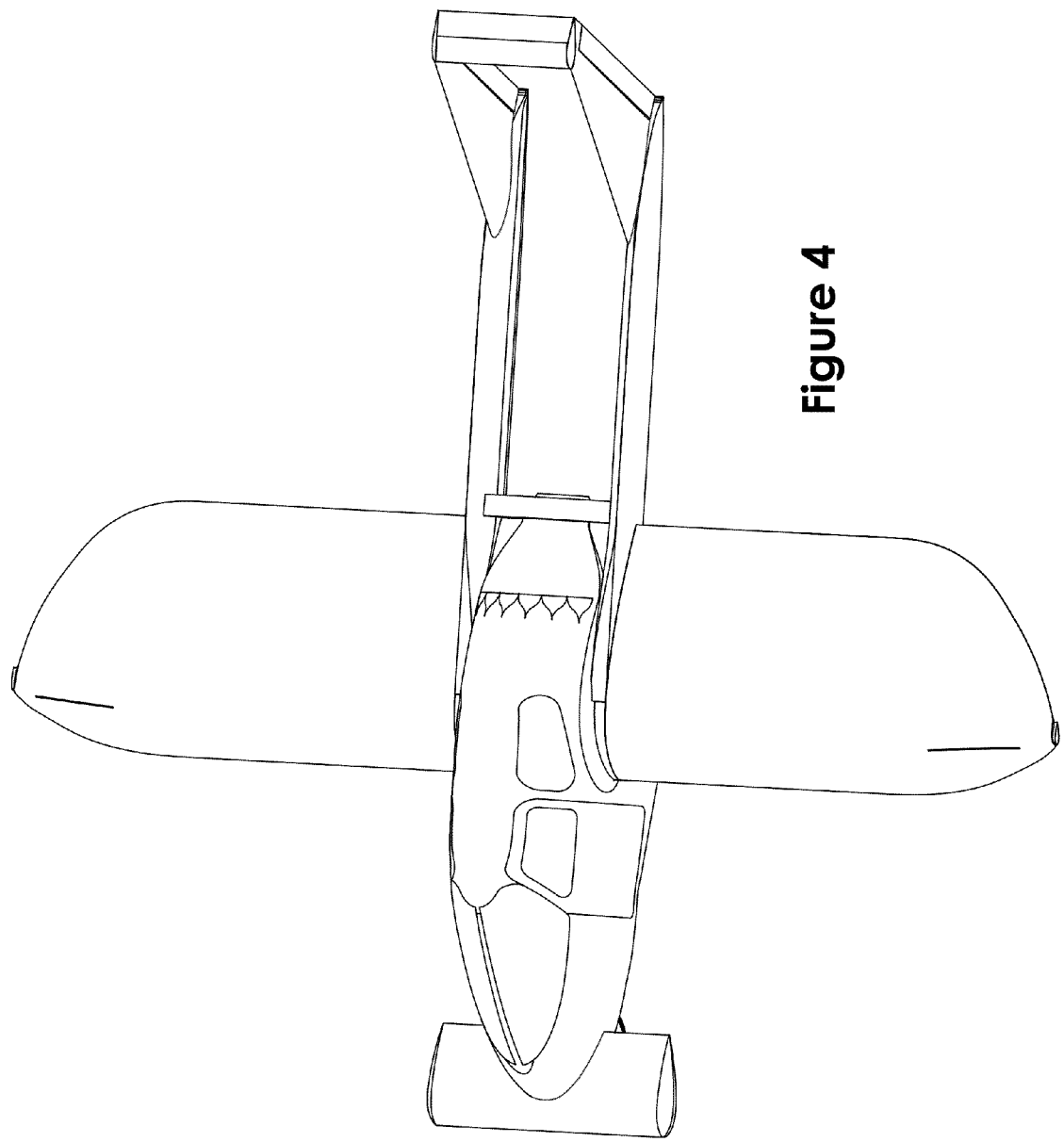
FIG. 4 is a top perspective view of the roadable aircraft of the present invention, illustrating the wings extended and folded out for flight.

FIG. 3 is a front perspective view of the roadable aircraft of the present invention, illustrating the wings extended and folded out for flight. FIG. 4 is a top perspective view of the roadable aircraft of the present invention, illustrating the wings extended and folded out for flight. Referring to FIGS. 3 and 4, the roadable aircraft of the present invention is depicted in flight mode. In this mode, wing leading edges 715 are shown extended to each side of fuselage 100 from wing roots 200. Note that the wing root 200 may be located up or down from the Illustrated position to produce a low-wing or high-wing airplane. As will be discussed in more detail below, wing leading edges 715 contain wing spars and folding ribs, which, when extended, form a full-sized wing as illustrated in FIGS. 3 and 4.

Figure 10:
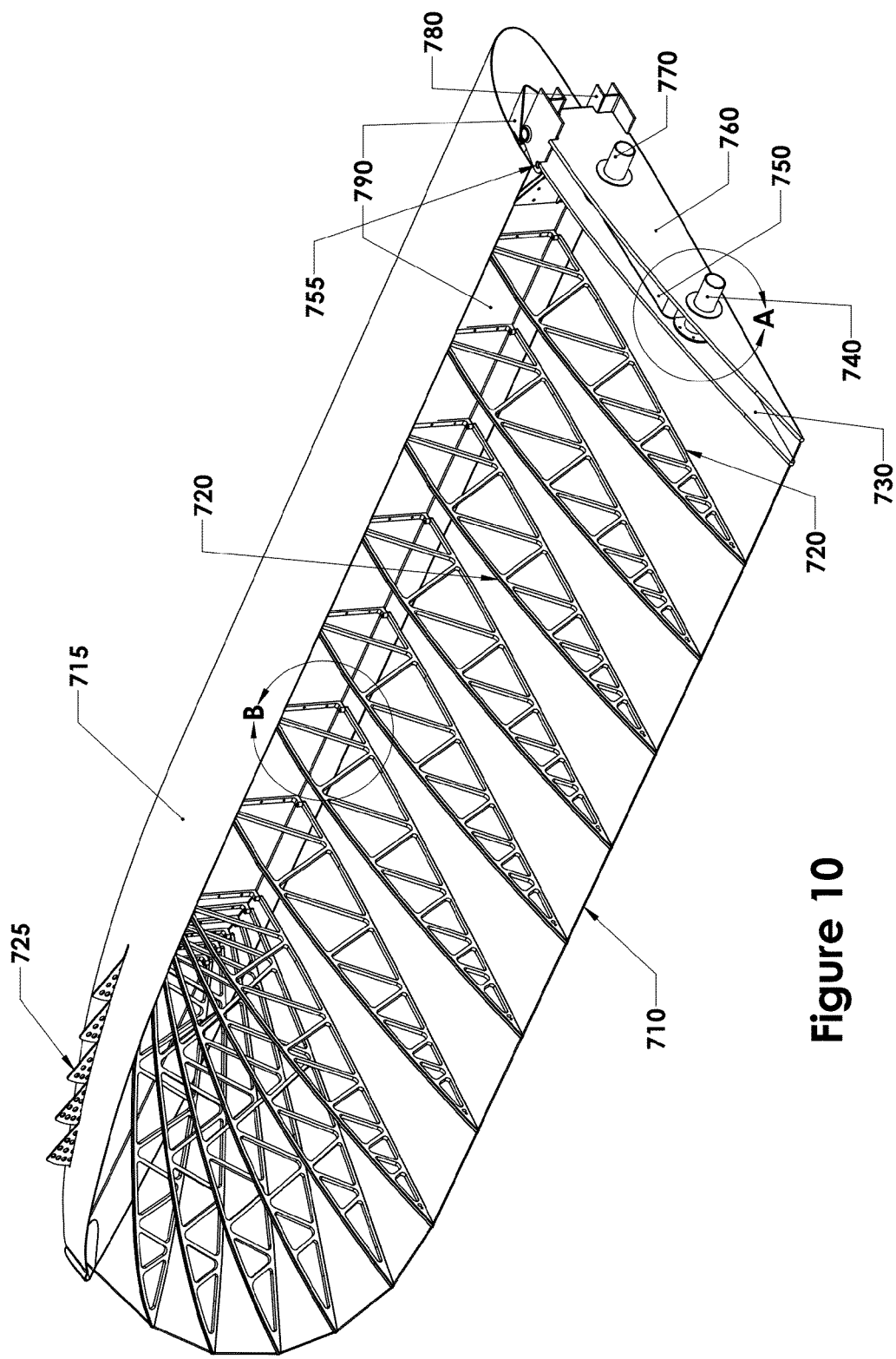
FIG. 10 is a perspective view of one wing of the roadable aircraft of the present invention, shown with the flexible wing skin removed for purposes of clarity, illustrating the folding wing ribs of the present invention.
Figure 11:
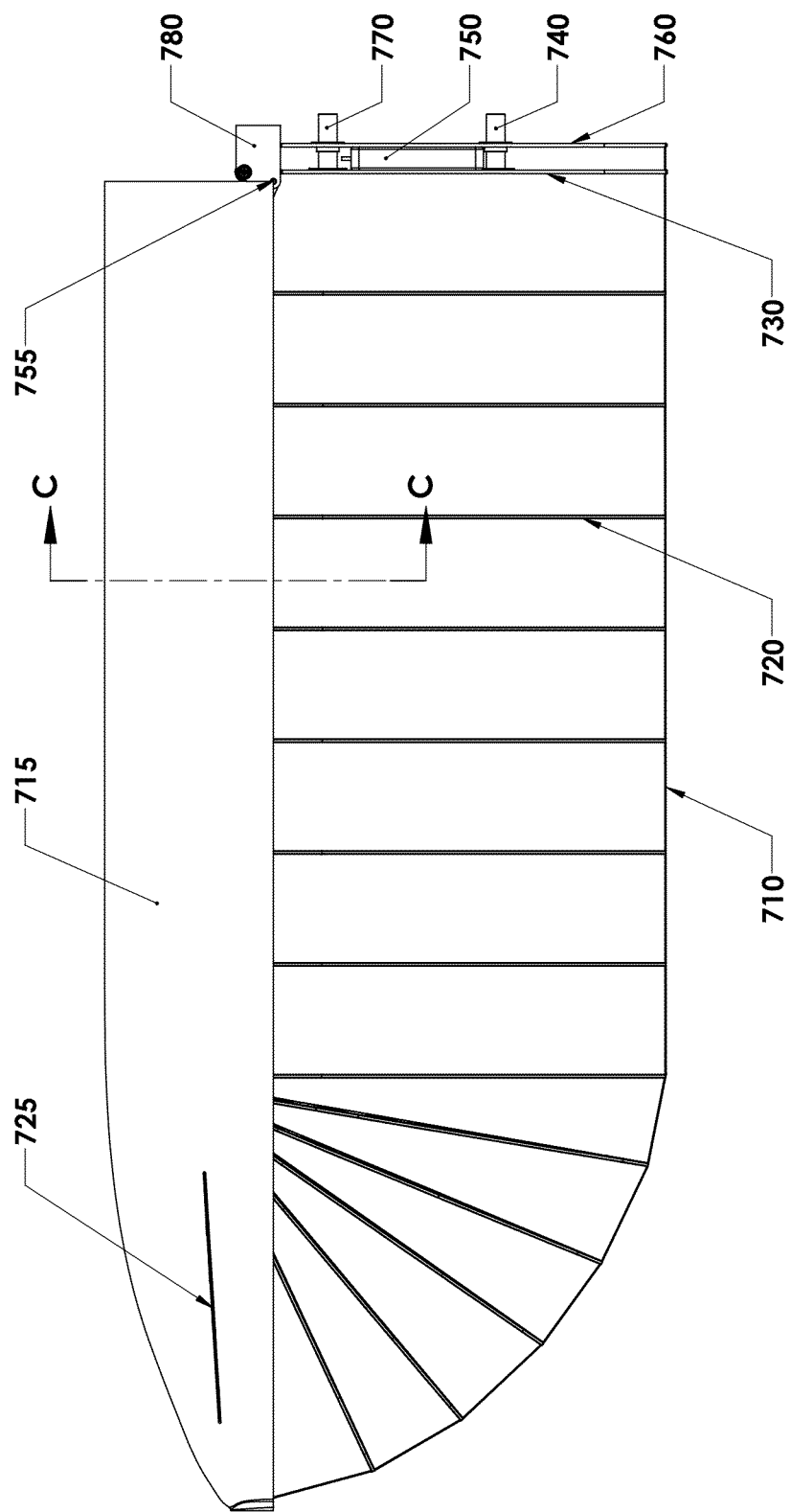
FIG. 11 is a top view of one wing of the roadable aircraft of the present invention, shown with the flexible wing skin removed for purposes of clarity, illustrating the folding wing ribs of the present invention in the extended position.
Figure 12:
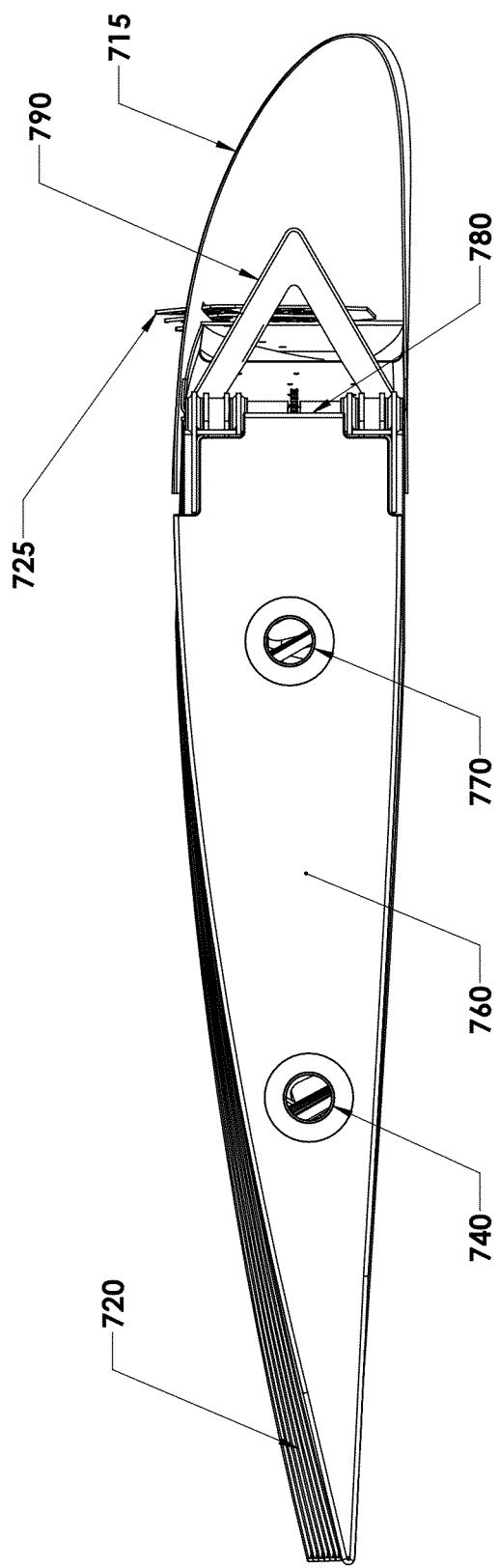
FIG. 12 is a view looking outboard from the root ribs of one wing of the roadable aircraft of the present invention, shown with the flexible wing skin removed for purposes of clarity, illustrating the folding wing ribs of the present invention in the extended position.

FIG. 10 is a perspective view of one wing of the roadable aircraft of the present invention, shown with the flexible wing skin removed for purposes of clarity, illustrating the folding wing ribs of the present invention. FIG. 11 is a top view of one wing of the roadable aircraft of the present invention, shown with the flexible wing skin removed for purposes of clarity, illustrating the folding wing ribs of the present invention in the extended position. FIG. 12 is an outboard view of the root of wing of the roadable aircraft of the present invention, shown with the flexible wing skin removed for purposes of clarity, illustrating the folding wing ribs of the present invention in the extended position. Notice the washout of the outboard ribs.

Referring to FIGS. 10-12, the foldable, collapsible wing of the present invention may comprise a main spar structure 790, which may have a triangular cross-section, as shown, for torsional rigidity and strength, attached to the wing hinge support structure 780 via wing hinge 755, plus a plurality of hinged ribs 720 attached to the main spar structure 790. In the preferred embodiment of the present invention, ribs 720 may be water jet or laser cut from performed sheets of composite material. In alternative embodiments, ribs 720 may be stamped or otherwise formed of aluminum or other metals, or may even be built up from wood or other traditional materials. Since there is only one main spar 790 in the preferred embodiment, ribs 720 may need to be particularly stiff and thus a composite structure may be used to maintain rigidity while keeping weight to a minimum. Each of inboard ribs 720 may be made the same size and shape, to reduce tooling costs. At the outboard end of the wing, ribs 720 are of differing sizes and shapes and are hinged in close proximity in order to fit into the leading edge fairing and to form a somewhat rounded wingtip.

Leading edge 715 may be mounted to main spar 790 as will be discussed in more detail below. Leading edge 715 may also be made of composite material, and may be provided with leading edge slots or retractable slats to lower stall speed for landing and the like. Leading edge 715 provides an aerodynamic airfoil leading edge shape to the wing and also houses main spar 790 and associated rib hinges and fabric tensioning apparatus as will be discussed in more detail below. Root rib 730 does not retract, being attached to the fuselage primary structure via tubes 740 and 770. Tensioning rib 760 is free to slide on tubes 740 and 770 as positioned by air bladder 750. The flexible wing skin is attached to rib 760 but not 730 so that tension may be applied in the span-wise direction. Cable or rope 710 may be attached to the ends of ribs 720 and at one end to leading edge 715 and at another end to tensioning rib 760. Cable or rope 710 may comprise a Kevlar rope and is attached to the aft end of folding ribs 720 to keep the wing skin in shape and help brace folding ribs 720 when the wings are extended.

Because of the collapsible and foldable design of the wings of the present invention, the use of conventional ailerons and flaps may be more difficult to implement, without added weight and complexity. This is not to say that such a design is not possible, but that in order to reduce weight and also reduce complexity of the design, alternative control surfaces may be employed. As illustrated in FIG. 10, deployable spoilers 725 may be used, popping up from leading edge 715 in response to control inputs. Spoilers 725 may be electronically or mechanically actuated through control cables or push-rods (not shown) routed through leading edge 715 and into wing root 200 into fuselage 100.

Figure 16:
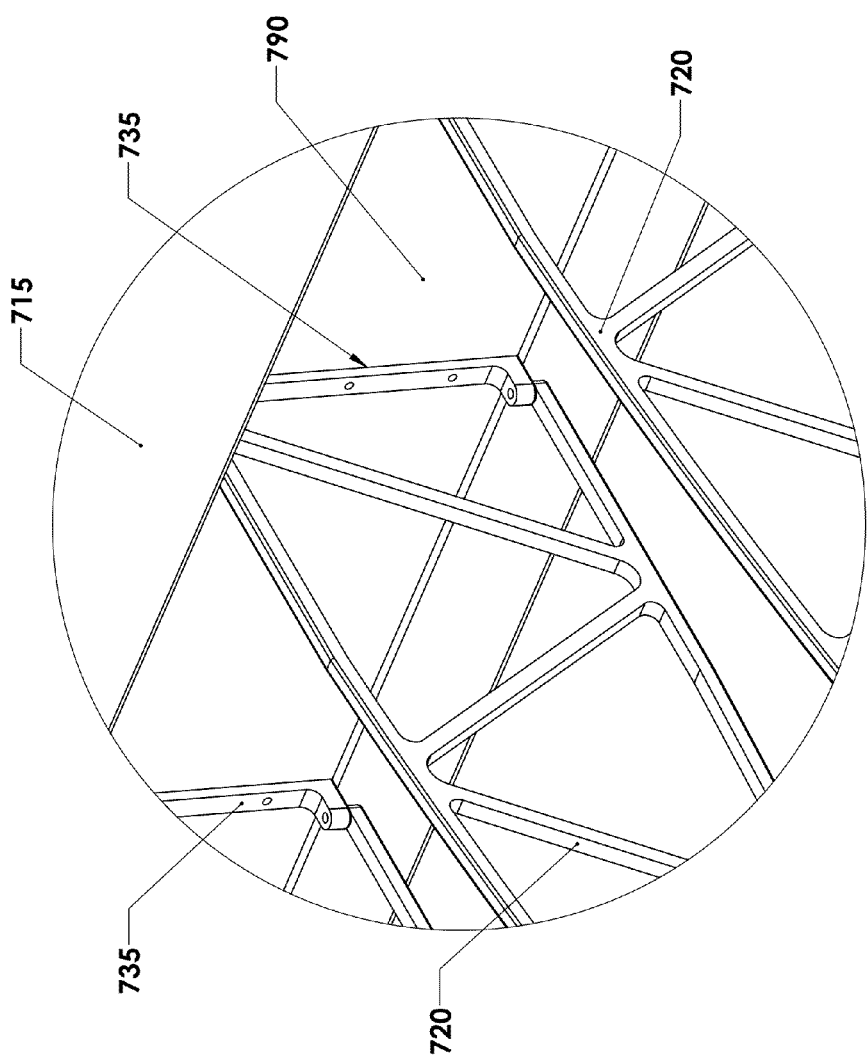
FIG. 16 is an enlarged detail view of detail B of FIG. 10, illustrating the hinging mechanism used for the hinging ribs of the present invention.
Figure 17:
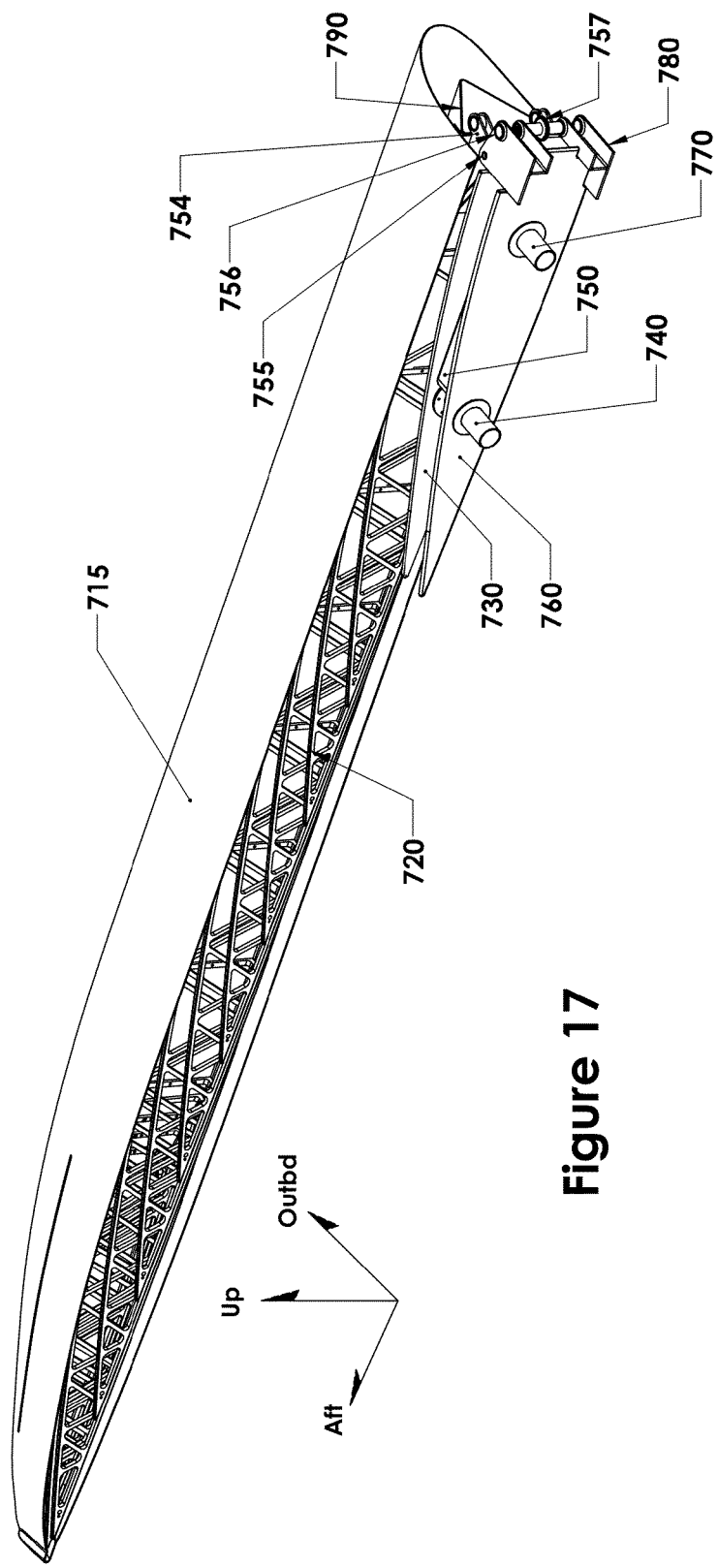
FIG. 17 is a perspective view of one wing of the roadable aircraft of the present invention, shown with the flexible wing skin and tail boom removed for purposes of clarity, illustrating the wing of the present invention in the folded and stowed position.

FIG. 16 is an enlarged detail view of detail B of FIG. 10, illustrating the hinging mechanism used for the hinging ribs 720 of the present invention. Wing ribs are hinged on brackets 735 attached to the aft web of main spar 790. Wing ribs 720 may swing on brackets 735 to nest in the leading edge fairing 715 when the wing is folded. Main spar 790 is attached to the fuselage primary structure through wing hinge support structure 780. Wing hinge 755 of hinge support structure 780 is located such that the leading edge 715 is flush with the tail boom (151A or 151B) when folded. When collapsing and folding the wings, hinged wing ribs 720 fold back along main spar 790 as illustrated in FIG. 17 as will be discussed in more detail below. By hinging ribs 720 into main spar 790, the entire wing may be collapsed along main spar 790, which may then pivot on hinge 755 flush against one of tail booms 151A or 151B (depending if the wing is on the left or right side). The wing skin, therefore, has to be made of a flexible material that can be folded repeatedly without damage. Traditional cotton or poly fiber materials used in "tube and rag" aircraft are doped with butyrate or nitrate dope or more advanced polymer processes to form a fairly rigid fabric surface, which resists flutter at high airspeed. Flutter of the wing skin can lead to loss of control or a crash, and thus needs to be avoided.

The fabric used in the wings of the present invention may comprise nylon, Kevlar, Dacron or other type of strong and flexible material similar to that used on high performance racing sailboat sails. Such a fabric, properly formulated and assembled, can be folded numerous times without losing strength. However, such fabrics are prone to stretching and also may flutter if not kept taut. In a sailboat, this (luffing) is not as much of an issue, as fabric stretch can be accommodated by increasing tension on the sail (via down haul, clew haul, out haul or the like). However, in a traditional aircraft there is no mechanism for maintaining tension on flexible wing skins, as the doping (or polymer) process shrinks the fabric to the wing ribs, where it remains for the life of the fabric. Thus, a need exists to provide a mechanism whereby fabric tension can be automatically maintained when the wings of the present invention are extended for flight. Using traditional ropes or devices as in sailboats could be difficult and require the user to make myriad adjustments, possibly from outside of the aircraft, which would increase the time to convert from road-going mode to aircraft mode. In addition, once in flight, if flutter becomes an issue, it may be difficult, using such traditional techniques, to adjust tension in the wing skin.

Figure 13:
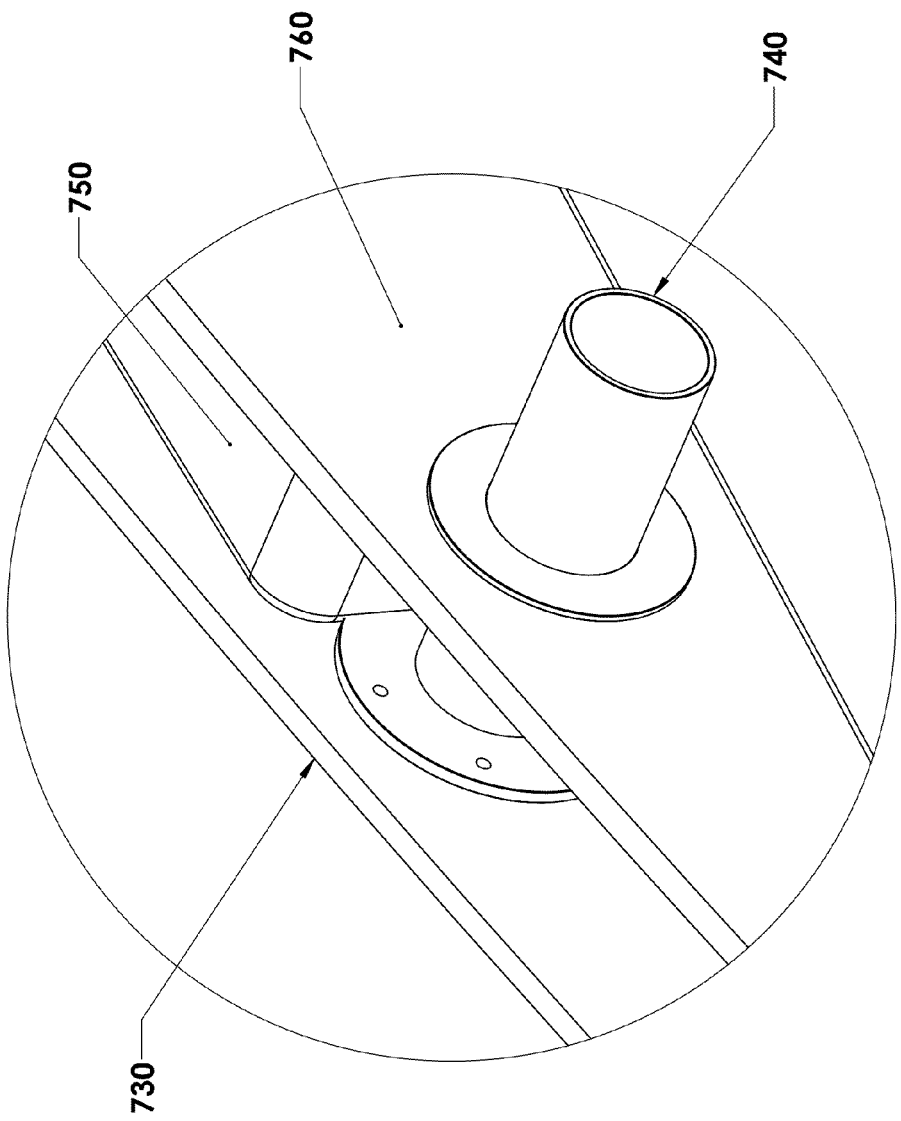
FIG. 13 is an enlarged detail view of area A of FIG. 10, illustrating the span-wise tensioning bladder for maintaining tension on the wing skin.

To solve the above-mentioned problem, in the present invention, one or more tensioning air bladders 750 are used to maintain span-wise tension on the wing skin. At the root of the wing, between tensioning rib 760 and root rib 730 is a bladder 750. FIG. 13 is an enlarged detail view of area A of FIG. 10, illustrating the span-wise tensioning bladder 750 for maintaining tension on the flexible wing skin. Note in detail A of FIG. 10, illustrated in FIG. 13, that tubes 740 and 770 attach to root rib 730 through holes in attach rib 760. Bladder 750, when inflated, exerts pressure between root rib 730 and tensioning rib 760, spreading them apart slightly. Since root rib 730 is fixed, this spreading of ribs 730 and 760 serves to tension the flexible fabric (not shown) covering the wing. Thus, any span-wise slack in the flexible wing skin may be removed. By altering pressure in bladder 750, the tension on the wing skin can be maintained at an optimum level. There is a direct relationship between bladder pressure and fabric tension and thus a predetermined bladder pressure may insure a desired fabric tension.

Note that other types of actuators other than bladder 750 may be used, including hydraulic cylinders, electromechanical actuators, mechanical actuators, and the like. However, bladders 750 are inexpensive and easy to employ and also lightweight, making them a suitable choice. Bladders 750 may be pressure compensated for altitude to insure that the tension on the wing skin is maintained throughout all aspects of flight.

Figure 14:
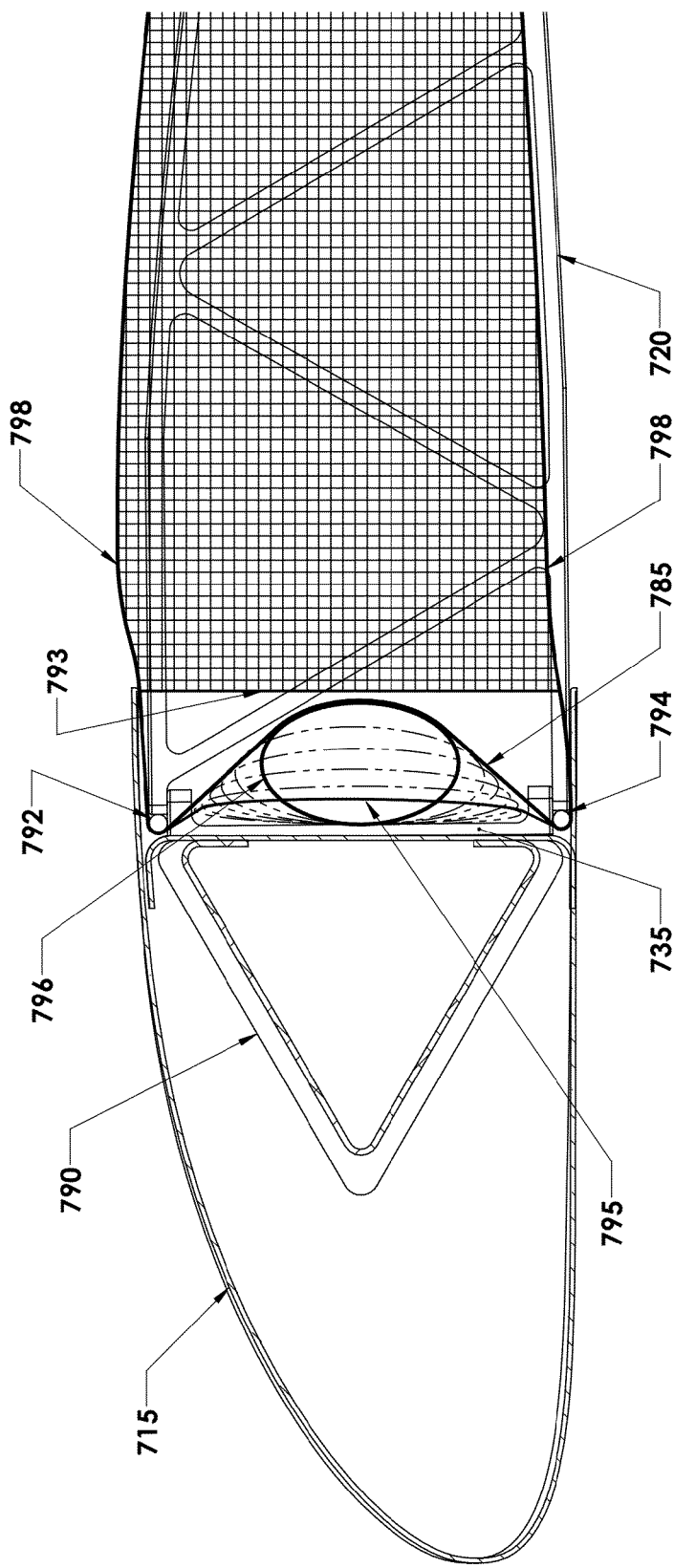
FIG. 14 is a partial section long lines C-C of FIG. 11, illustrating the chord-wise tensioning bladder used to maintain tension on the wing skin.

FIG. 14 is a partial section along lines C-C of FIG. 11, illustrating the front tensioning bladder(s) 796 used to maintain chord-wise tension on flexible wing skin 798. Bladder(s) 796 may comprise a single bladder extending the length of wing spar 790, or a number of interconnected discrete bladders located along wing spar 790. Flexible wing skin 798 may be sewn together or otherwise formed as a continuous tube of fabric surrounding folding wing ribs 720. Near the attachment hinge points of wing ribs 720, wing skin may pass over rounded tubular sections (span-wise bars) 792 and 794 mounted to hinges at the top and bottom of brackets 735. Bars 792 and 794 guide wing skin 798 around air bladder(s) 796 to the opposite side of ribs 720 and then aft. As illustrated in FIG. 14, as pressure is applied to bladder 796, it may inflate, causing the wing skin to move from position 795 to position 785. Filling air bladder 796 forces wing skin 798 out, putting tension on it. Note the skin path length difference between un-inflated and full bladder(s) 796 as illustrated by reference numerals 795 and 785, respectively. When bladder(s) 796 is empty, skin tension on wing skin 798 is released, which may allow the wing to more readily fold.

As with bladder 750, bladder(s) 796 may be replaced by other types of actuators, including hydraulic cylinders, electromechanical actuators, mechanical actuators, and the like. However, bladder(s) 796 are inexpensive and easy to employ and also lightweight, making them a suitable choice. Bladder(s) 796 may be pressure compensated for altitude to insure that the tension on the wing skin is maintained throughout all aspects of flight.

Figure 15B:
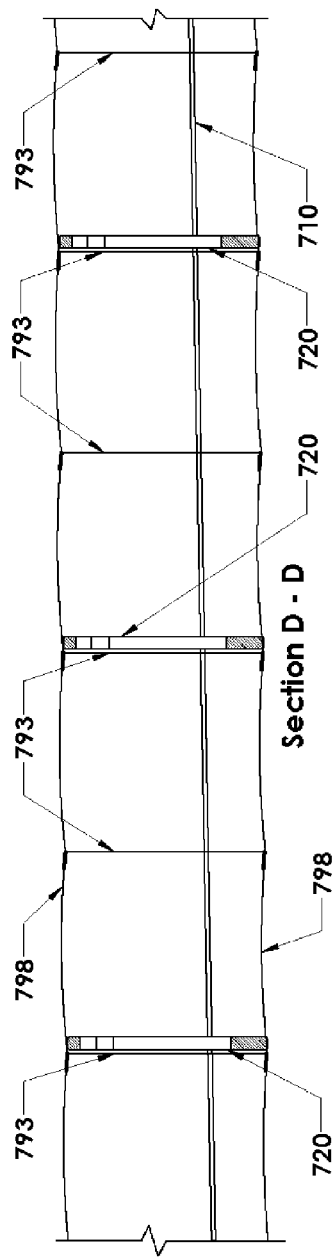
FIG. 15B is section detail of the wing through the ribs along line D-D of FIG. 15A, showing features of the flexible wing skin when the wings are extended for flight.
Figure 15A:
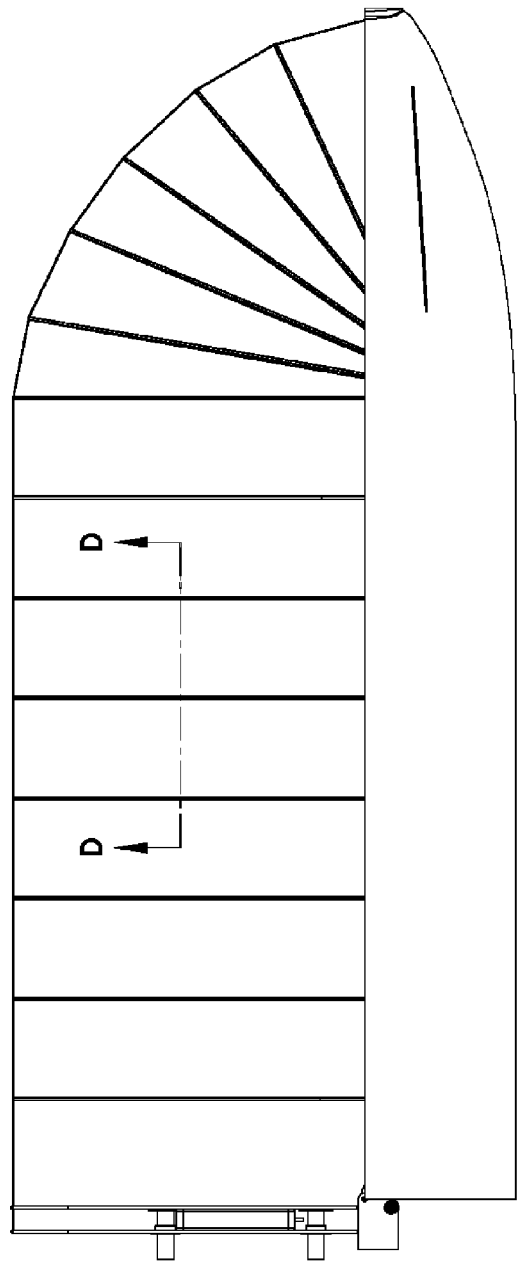
FIG. 15A is top view of the wing showing features of the flexible wing skin when the wings are extended for flight.

If the flexible wing skin of the preceding embodiment was attached to each individual rib along their top and bottom rails, the skin-tensioning feature described previously would be greatly hindered or completely negated. For this reason the flexible wing skin envelope is anchored only along its perimeter. Thus configured, however, the flexible wing skin envelope would balloon upward significantly when acted upon by the aerodynamic forces of flight, affecting the wing's airfoil shape detrimentally and adding significantly to drag. The flexible wing skin is therefore connected internally from the upper side to the lower side by a plurality of airfoil shaped gore panels 793, as seen in FIGS. 14 and 15. These gore panels are located just inboard of each rib and approximately mid way between ribs, allowing flexible wing skin movement for tensioning purposes. These gore panels aid in maintaining a truer airfoil shape and minimizing ballooning of the flexible wing skin under the influence of the aerodynamic forces of flight. The gore panels also serve to directly transfer the lifting force on the top side of the flexible wing skin directly to the lower skins, from whence the force is supported by the ribs 720, which are in turn supported by the wing main spar structure 790.

An alternative folding rib arrangement would make it possible to attach the flexible wing skins directly to the tops and bottoms of the wing ribs along most of their lengths, further minimizing "ballooning" of the wing skins that distorts the airfoil and decreases wing efficiency. In this wing structure embodiment the hinges for all of the ribs are grouped as closely as possible at the wing root, resulting in a fan shaped aft wing. The leading edge would still be primarily a fairing, with a rib-like spar within it. The remainder of the ribs would all be approximately the same length and would have to be stronger than the ribs of the previous embodiment because they would be longer. These ribs still nest within the leading edge fairing as it folds toward the boom. Gore panels midway between ribs would still be desirable, to help maintain the airfoil shape and, through integral elasticity, facilitate the wing skins in folding neatly and repeatably. Only the wing root tensioning mechanism, as previously described, would be needed in this wing structure embodiment because tension would be transferred from rib to rib and ultimately to the leading edge fairing, providing skin tension both span-wise and chord-wise. Such a wing would have the disadvantage of being of lower aspect ratio, with a relatively longer root chord. This would potentially hinder cockpit access, but would probably be acceptable for a one or two place version of this roadable aircraft.

FIG. 17 is a perspective view of one wing of the roadable aircraft of the present invention, shown with the flexible wing skin removed for purposes of clarity, illustrating the folding wing ribs 720 of the present invention in the folded position. As the wing pivots aft, hinged ribs 720 pivot on their hinges, eventually laying against the web of main spar structure 790 and each other. All that is left visible of the wing is the leading edge fairing 715, which protects the wing skin 798 and ribs 720 from the elements. Root rib 730, skin-tensioning bladder 750, and the wing hinge support structure 780 are fixed to the fuselage structure at wing root 200.

Figure 18:
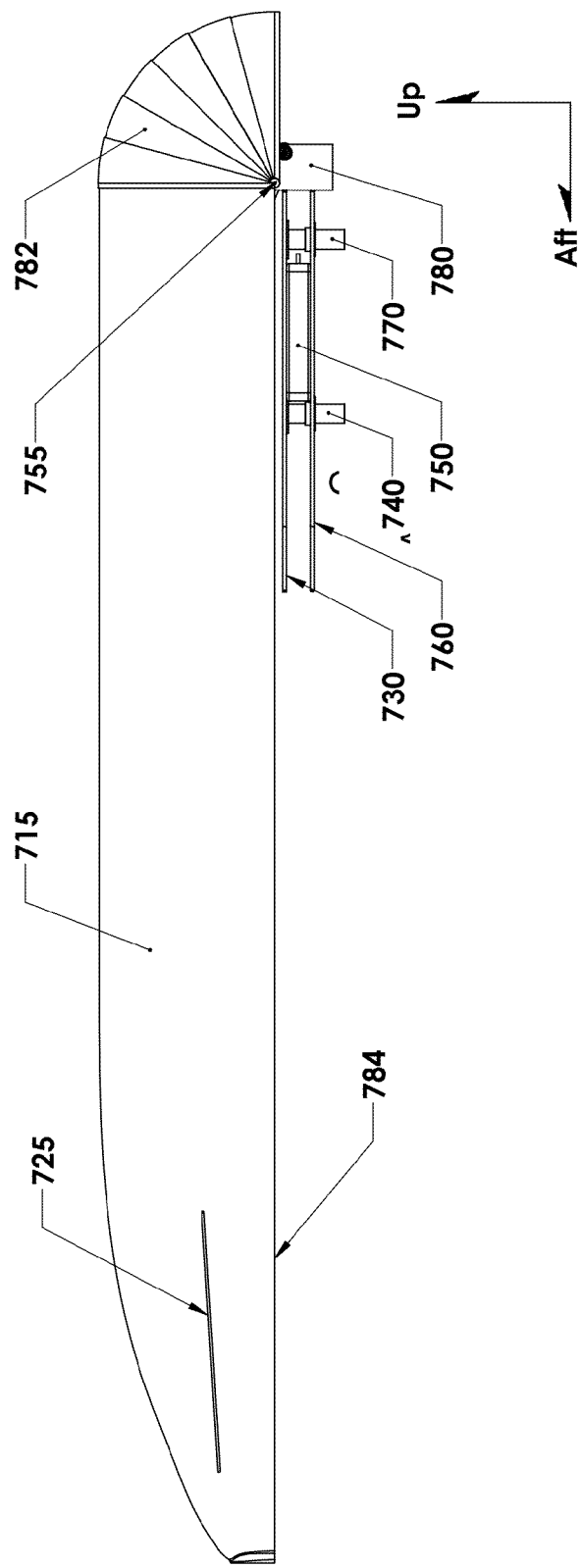
FIG. 18 is a top view of one wing of the roadable aircraft of the present invention, shown with the flexible wing skin removed for purposes of clarity, illustrating the folding wing ribs of the present invention in the folded position and the use of a segmented fairing.
Figure 19:
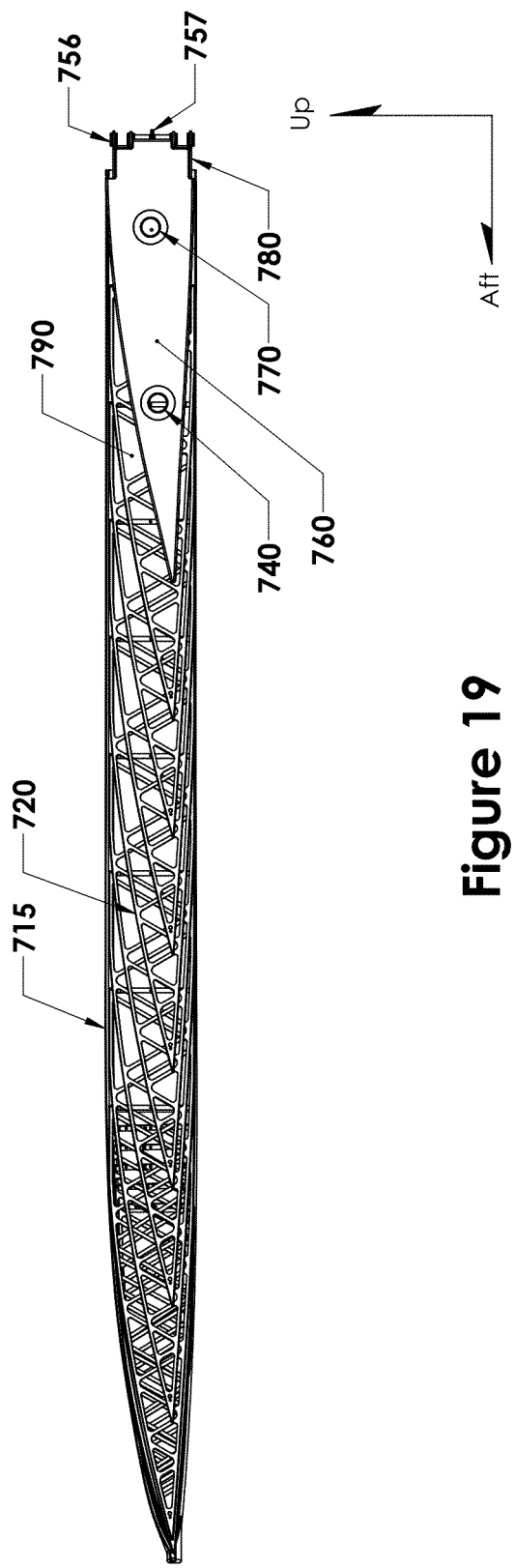
FIG. 19 is a side view of one folded and stowed wing of the roadable aircraft of the present invention, shown with the flexible wing skin removed for purposes of clarity, illustrating the folding wing ribs of the present invention in the folded position.
Figure 20:
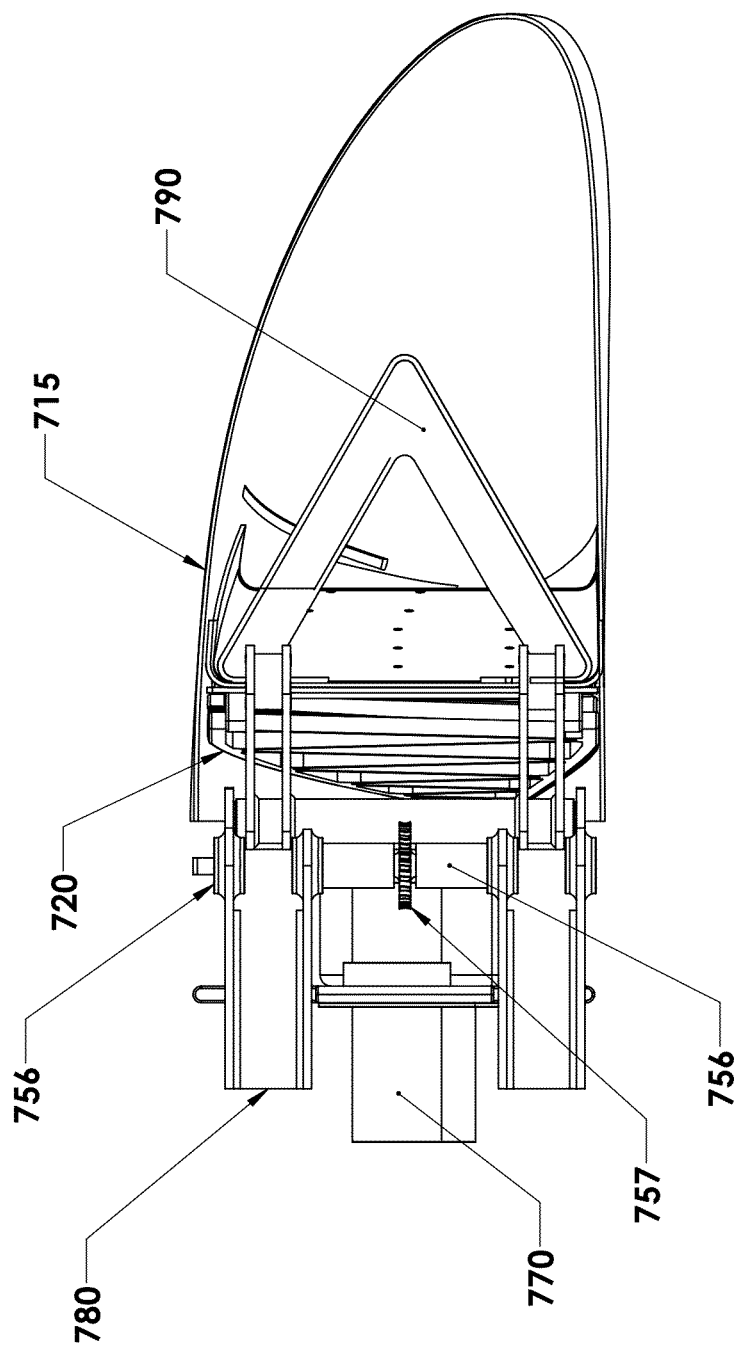
FIG. 20 is a front end view of one folded and stowed wing of the roadable aircraft of the present invention, shown with the segmented fairing removed for purposes of clarity, illustrating the leading edge fairing, spar structure and hinge mechanism of the present invention in the folded position.

FIG. 18 is a top view of one wing of the roadable aircraft of the present invention, shown with the flexible wing skin removed for purposes of clarity, illustrating the folding wing ribs 720 of the present invention in the folded position and the use of a segmented fairing 782. When the wing is folded, the aft edge 784 of the leading edge fairing 715 nests to the side of one of the tail booms 151A or 151B. Segmented fairing 782 attached to one end of leading edge fairing 715, extends as the wing folds to protect the hinge and open end of the wing from the elements. FIG. 19 is a side view of one wing of the roadable aircraft of the present invention, shown with the flexible wing skin and tail boom removed for purposes of clarity, illustrating the folding wing ribs of the present invention in the folded position. Wing skin gore panels 793 may have elastic strands embedded vertically so that the wing skin folds neatly as the ribs do, reducing the likelihood of the wing skin binding, tearing, or otherwise being damaged during the folding process. FIG. 20 is an end view looking outboard of one wing of the roadable aircraft of the present invention, shown with the segmented fairing removed for purposes of clarity, illustrating the folding wing of the present invention in the folded position. This view shows locking mechanism 756 and locking pin actuating mechanism 757 of hinge support structure 780, which keep the wings extended in flight.

Figure 6:
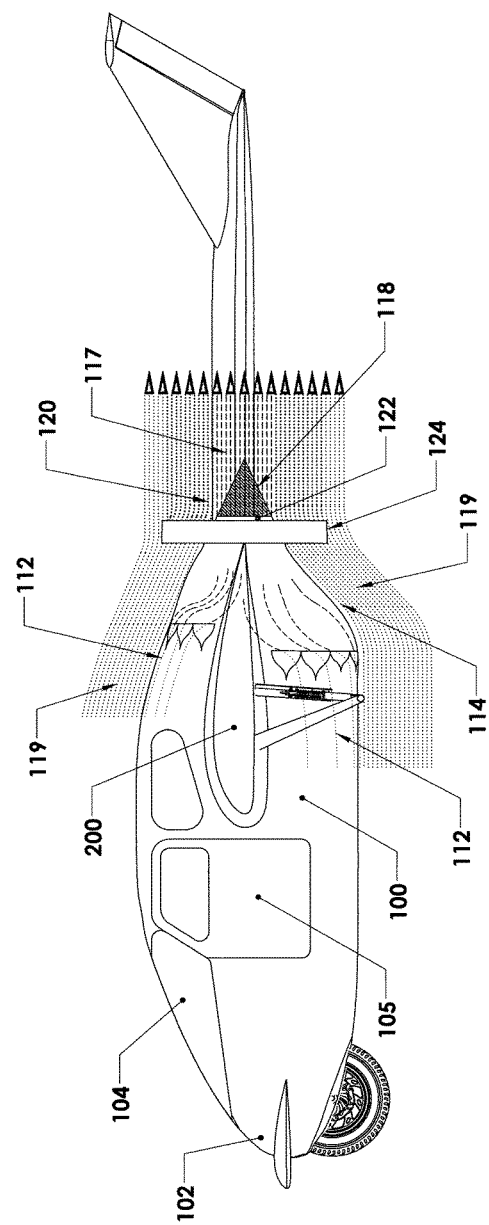
FIG. 6 is a side view of the fuselage of the roadable aircraft of the present invention, illustrating the boundary layer of air flowing past the fuselage, the low energy layer being drawn into the engine compartment and the higher energy air continuing aft into the ductless fan of the present invention.
Figure 7:
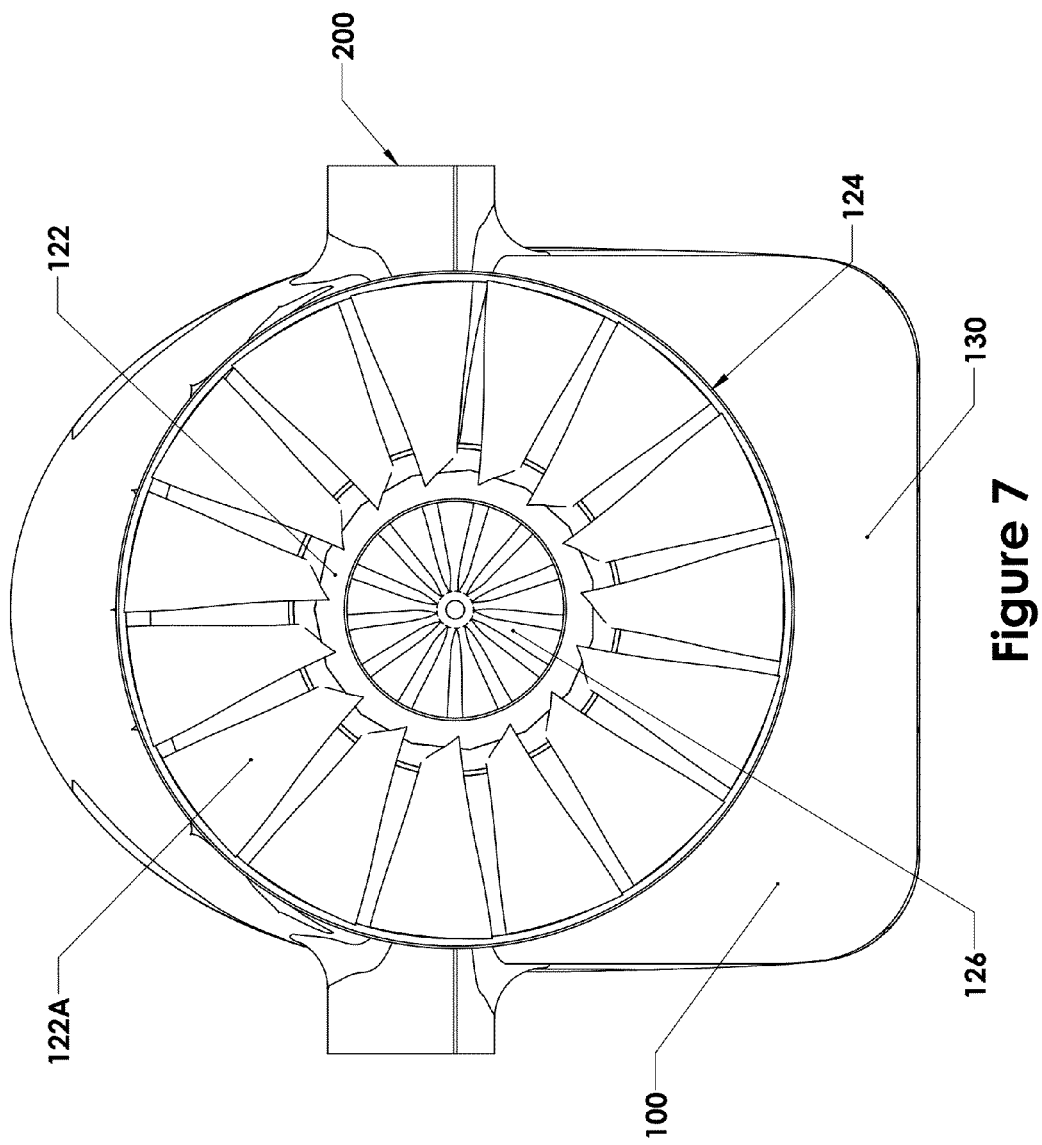
FIG. 7 is a rear view of the fuselage of the roadable aircraft of the present invention illustrating the ductless fan of the present invention and the center extraction fan.
Figure 8:
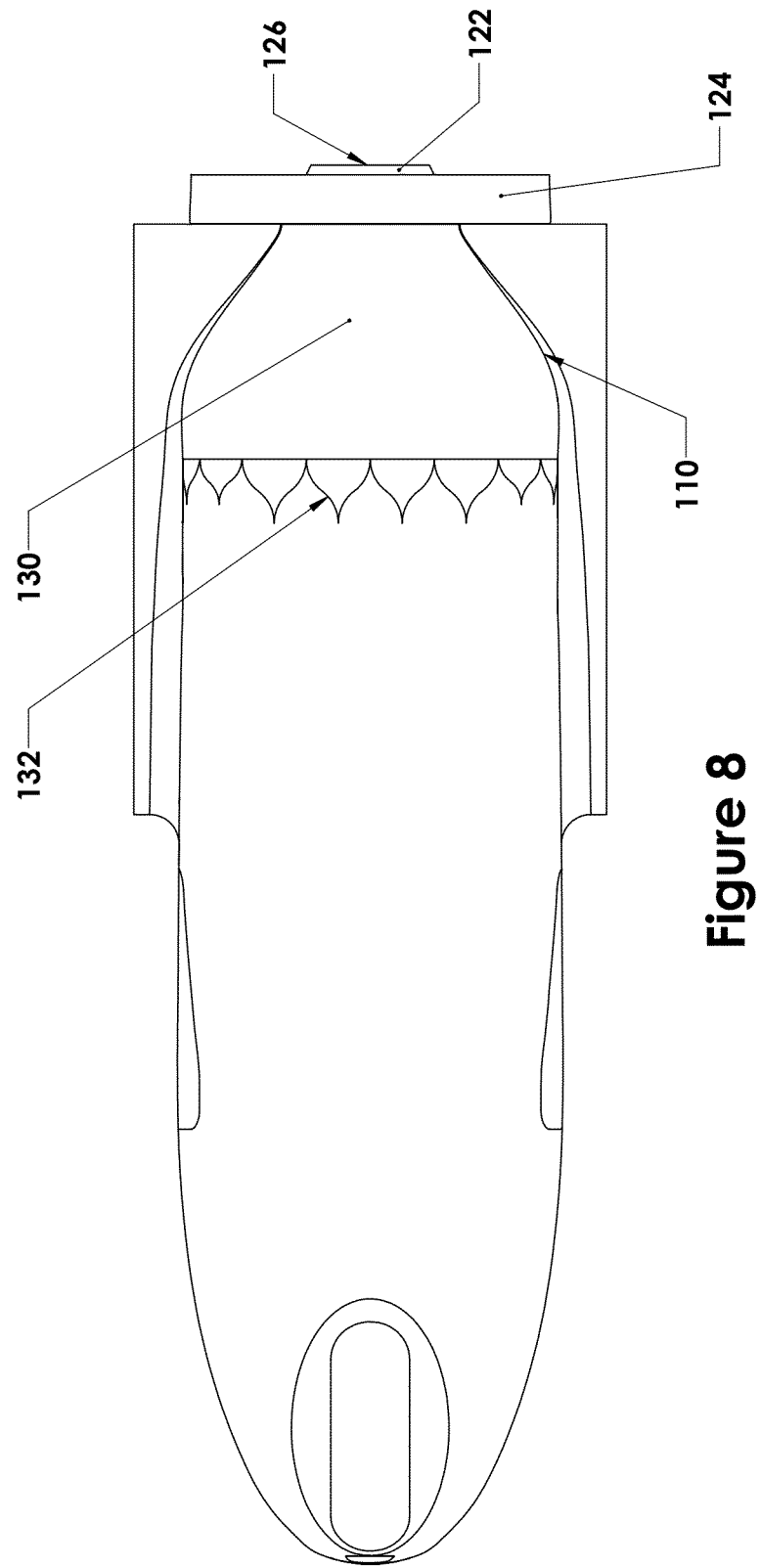
FIG. 8 is a bottom view of the fuselage of the roadable aircraft of the present invention, illustrating the location of suction inlets.
Figure 9:
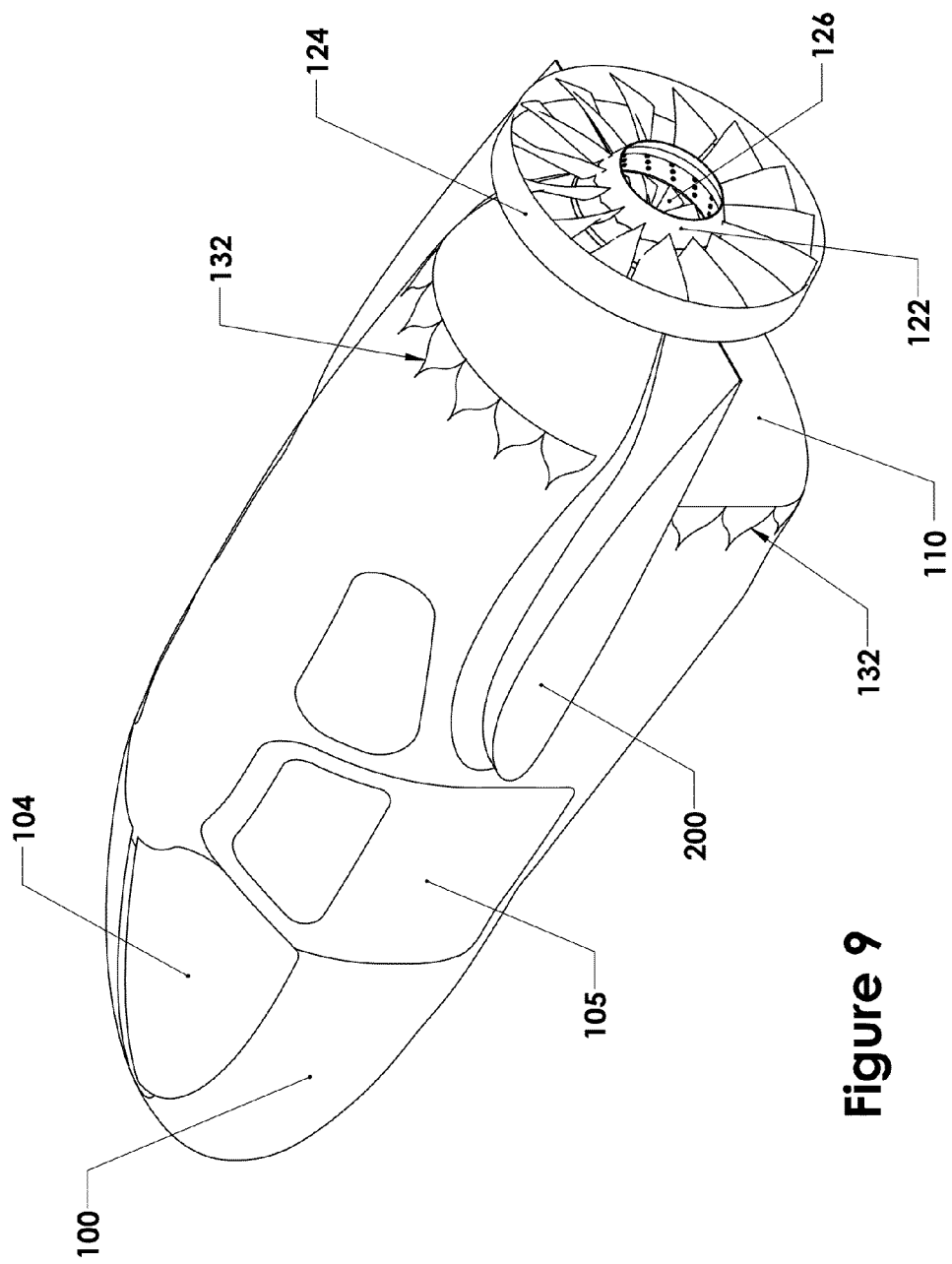
FIG. 9 is a rear quarter perspective view of the fuselage of the roadable aircraft of the present invention, illustrating components of the ductless fan of the present invention and the center extraction fan.

FIG. 6 is a side view of the fuselage of the roadable aircraft of the present invention, with left wheel and boom removed for clarity, illustrating the free stream air 119 flowing past the fuselage into the ductless fan of the present invention. FIG. 7 is a rear view of the fuselage of the roadable aircraft of the present invention illustrating the ductless fan of the present invention and the center extraction fan. FIG. 8 is a bottom view of the fuselage of the roadable aircraft of the present invention, illustrating the location of suction inlets. FIG. 9 is a rear quarter perspective view of the fuselage of the roadable aircraft of the present invention, illustrating components of the ductless fan of the present invention and the center extraction fan. Referring to FIGS. 6-9, additional features of fuselage 100 will be discussed in more detail.

As noted previously, fuselage 100 may be constructed of composite materials to allow for ready fabrication and also to provide complex three-dimensional shapes, which provide for better aerodynamic efficienly. Fuselage 100 is made in the pusher configuration, with the propulsion unit located in the rear. For a road-going vehicle, moving the propulsion unit to the rear allows for better packaging and better safety, as there is no propeller blocking forward vision or creating a hazard to pedestrians or the like. In addition, by locating the power plant in the rear 110 of fuselage 100, it is easier to connect the power plant to rear wheels 102A and 102B as well as ductless fan 122. The pusher propulsion configuration allows the nose to be shaped for minimum drag, as well as eliminating the turbulent prop-wash over the fuselage. As a result there is better boundary layer adhesion of air flowing over the forward portion of fuselage 100.

Again, Referring to FIGS. 6-9, note that fuselage 100 is relatively short and tapers rather rapidly in the rear, due to the engine location. Under normal circumstances, such a short fuselage 100 tapering rapidly would result in boundary layer separation because the air next to the skin does not have enough energy to negotiate the abrupt direction change. Fuselage 100 also has to be wide enough at the bottom 130 for the engine, further aggravating the drag-producing blunt aft fuselage geometry and adding to the boundary later separation problem. Such boundary layer separation not only causes air turbulence and the accompanying drag, but might also reduce the efficiency of ductless fan 122 considerably. To correct this problem, one aspect of the present invention is the inclusion of an extraction fan to suck air from the surface of fuselage 100 to maintain the boundary layer energy at or near the surface of fuselage 100. This extraction fan concept is applicable only in a pusher propulsion configuration. It may be used with both conventional propellers as well as ductless fans such as ductless fan 122 of the present invention.

Ductless fan 122 of the present invention may be provided with a center-mounted extraction fan 126. This center-mounted extraction fan 126 may be ducted to inlets 132 along fuselage 100 to draw low energy air 112 into fuselage 100 and thus minimize or prevent separation of boundary layer 114. By providing the central extraction fan 126, which may be driven from the main rotor of ductless fan 122 or through a separate transmission, air drawn into the fuselage through ports, ducts or slots 132, and then pushed out though central extraction fan 126, may add to thrust of the aircraft. Extraction fan 126 is located in the hub of ductless fan 122 and uses it as a duct. Extraction fan 126 and ductless fan 122 may be driven separately, even possibly by two different power sources. Suction inlets 132 are positioned immediately forward of the flow separation point in cruise flight. If shaped as NACA inlets, as shown, these slots will draw in some low energy boundary layer air even without an extraction fan.

As illustrated in FIG. 8, suction inlets 132 are positioned immediately forward of the flow separation point in cruise flight. As illustrated in FIG. 7, boundary layer air is sucked into the aft cowl by extraction fan 126, while higher energy air 114 bypasses the slot and re-attaches to the aft surface. Higher energy air 114 stays close to the surface of fuselage 100, and inflow to the fan disc 122 helps keep this re-energized air attached to the aft portion of the fuselage. The taper ratio 116 of the aft fuselage 100 is reduced by the large diameter fan hub. In combination with fan inflow and air pumped out of the hub, flow separation is prevented or greatly reduced. If a conventional spinner (represented by cross-hatched outline 118) were used, turbulence would not be sufficiently prevented, as the separation of the low energy boundary layer 112 would start much further upstream, before fuselage 100 tapers significantly. Air 117 pumped through the hollow hub entrains the fan wash 120, further preventing flow separation and the resulting drag.

Figure 21:
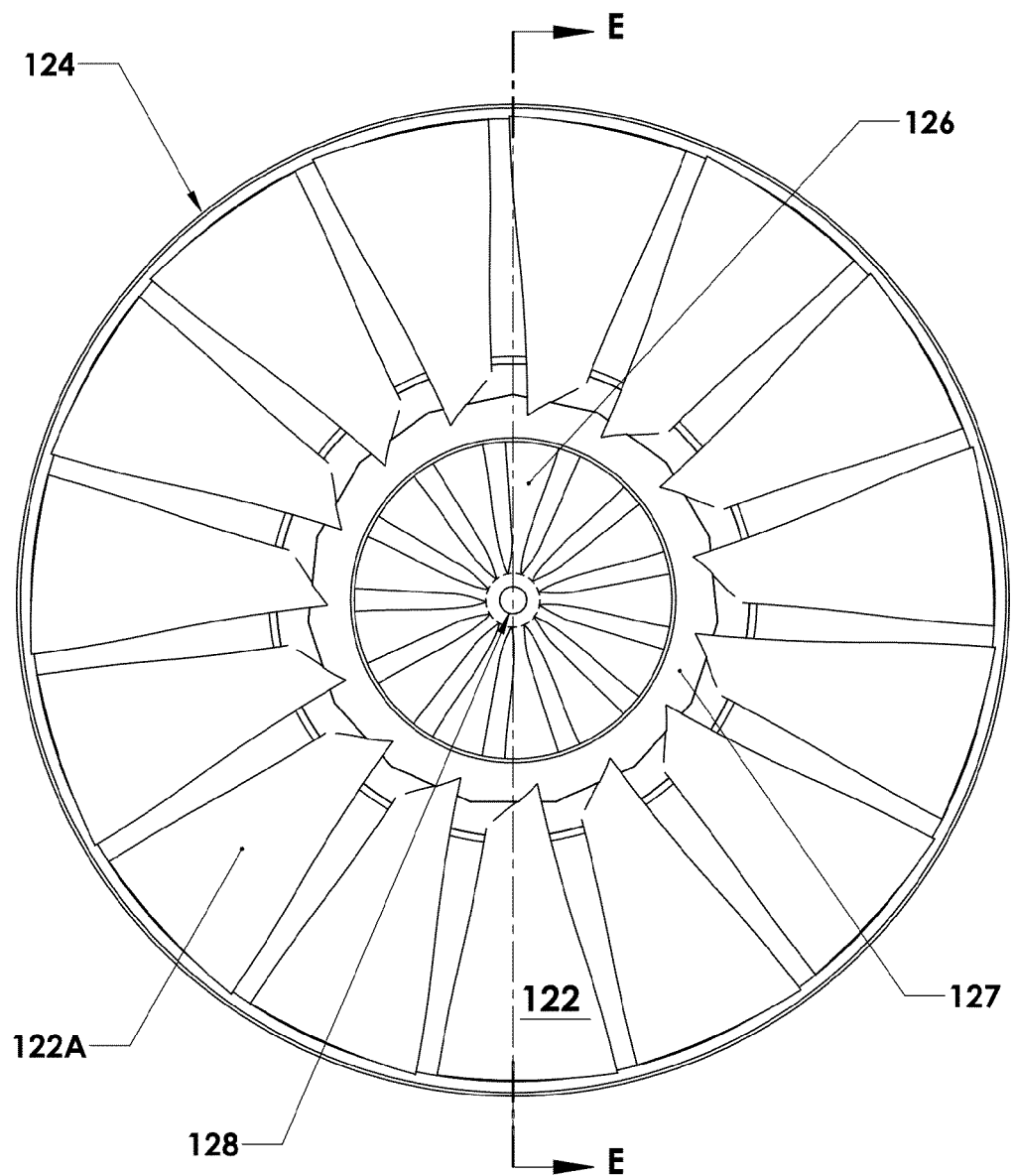
FIG. 21 is a rear view of the ductless fan of the present invention, illustrating the center extraction fan.
Figure 26:
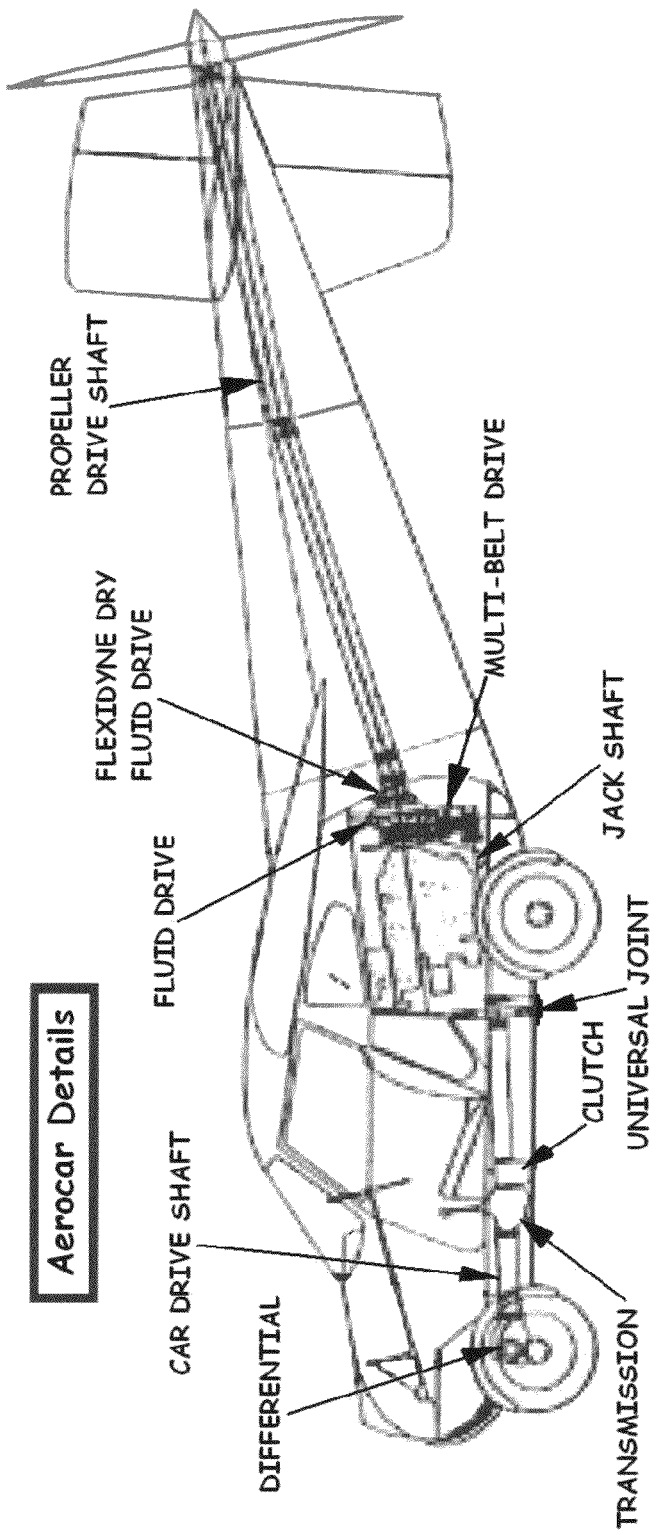
FIG. 26 is a side view of the Molt Taylor Aerocar of the Prior Art, illustrating details of the structure of that aircraft.

FIG. 21 is a rear view of ductless fan 122 of the present invention, illustrating center extraction fan 126 turning on shaft 128. Ductless fan 122 comprises a plurality of fan blades 122A, a fan shroud 124, and center hub 127 which in turn serves as a duct for extraction fan 126. A high-density fan blade arrangement 122A permits converting engine power to thrust in a much smaller diameter than a conventional propeller. Using a smaller diameter fan is necessary to keep the width of the roadable mode within the desired seven-foot vehicle width. As illustrated in Prior Art FIG. 26, one design difficulty faced with the Aerocar was in providing proper ground clearance for the propeller, which as canted upward and tail mounted to solve the problem, but as a result required a complex drive shaft. Locating the ductless fan closer to the aft wheels eliminates prop strikes without this long drive shaft. Having the fan shroud 124 as part of the assembly and turning with the blades 122A almost totally eliminates blade tip turbulence and losses.

Figure 22:
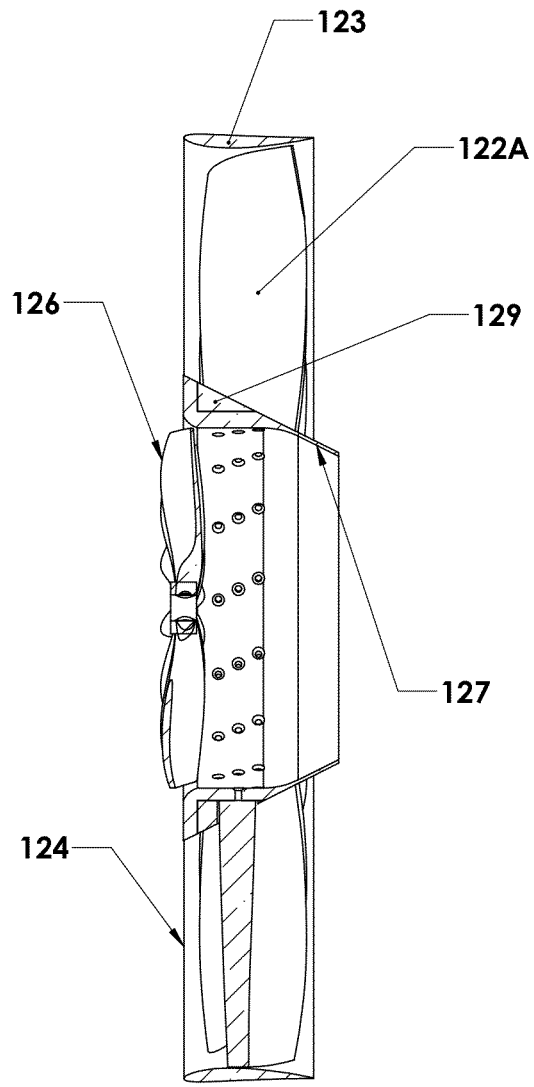
FIG. 22 is a cutaway view of the ductless fan of the present invention, along section lines E-E of FIG. 21.

FIG. 22 is a cutaway view of the ductless fan of the present invention, along section lines E-E of FIG. 21. The convergent nozzle inside the fan hub 127 accelerates extraction fan flow. Shroud airfoil shape 123 helps offset centrifugal force. The blades of ductless fan 122 may be fixed pitch, ground adjustable, flight adjustable or constant speed, just as any conventional propeller can. For flight adjustment and constant speed blade angle adjustment, a rotating cylinder with cam slots may be fitted into area 129, if desired. Inner extraction fan 126 and the propulsion fan 122 may be driven separately so their RPM may be optimized. Rotating inner extraction fan 126 in the opposite direction as propulsion fan 122 may reduce exhaust turbulence and help offset torque effects from ductless fan 122.

Figure 23:
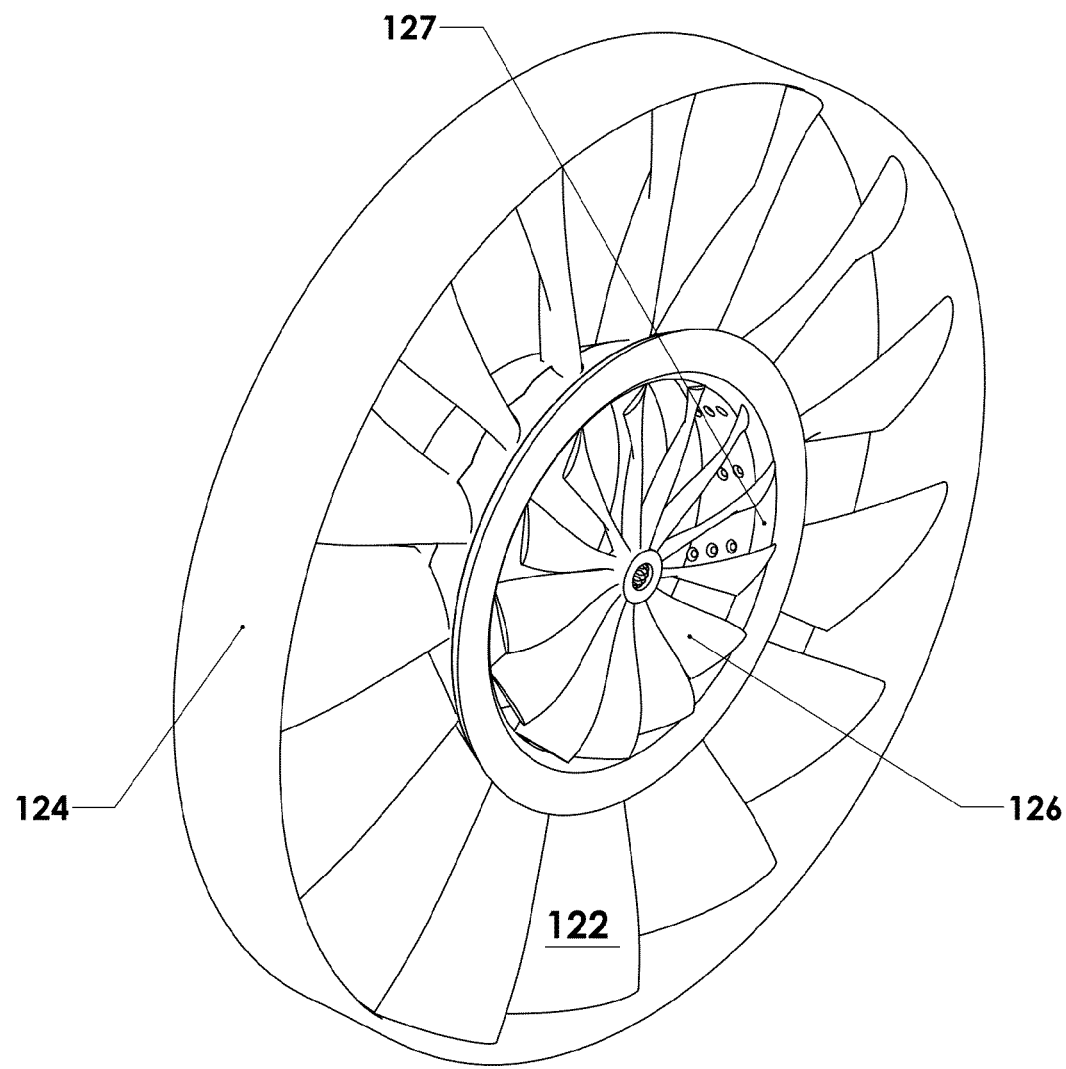
FIG. 23 is a front perspective view of the ductless fan of the present invention illustrating the center extraction fan.

FIG. 23 is a forward perspective view of the ductless fan of the present invention illustrating the center extraction fan. This Figure illustrates how the inner extraction fan 126 uses the propulsion fan hub 127 as a duct for increased efficiency. In an alternative embodiment, inner extraction fan 126 may have its own duct, exhausting into the propulsion fan hub 127.

Figure 24:
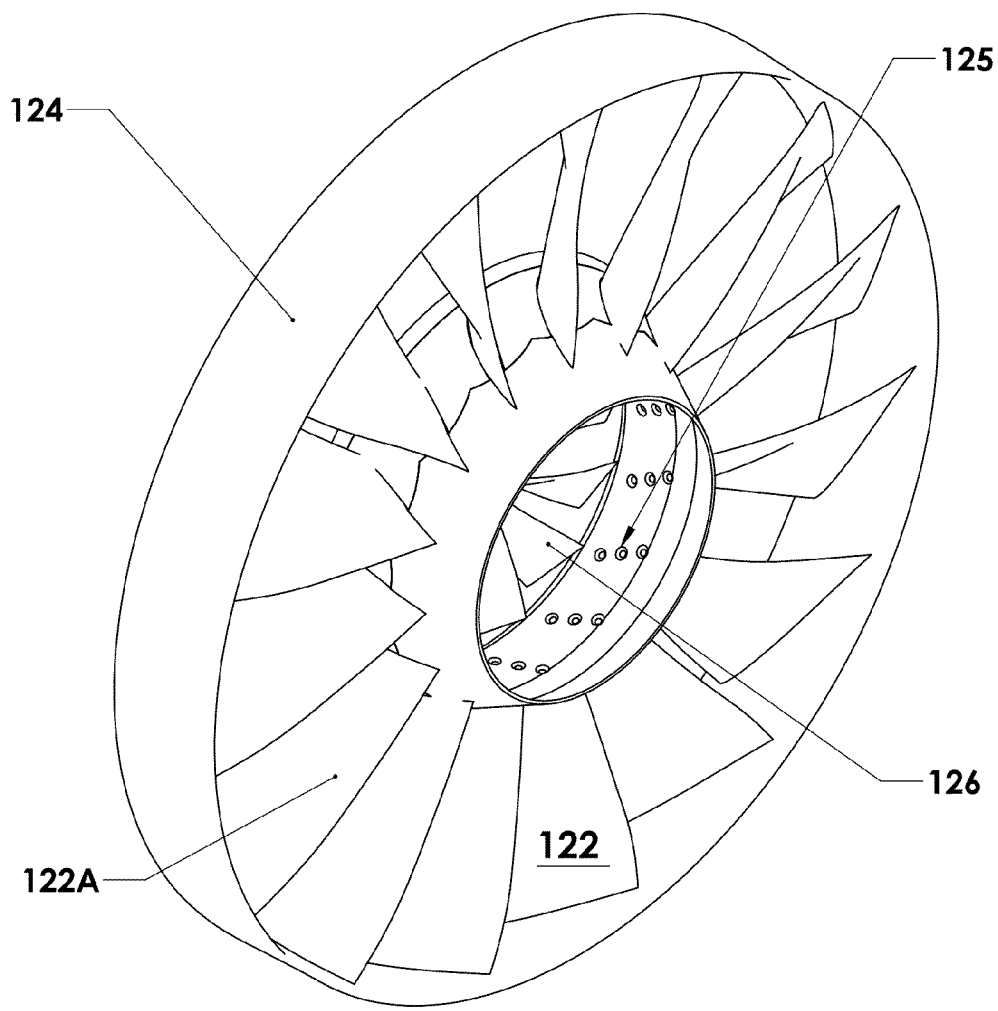
FIG. 24 is a rear perspective view of the ductless fan of the present invention, illustrating the center extraction fan.

FIG. 24 is an aft perspective view of the ductless fan of the present invention, illustrating the center extraction fan. This Figure illustrates how propulsion fan blades 122A may be ground adjustable. Propulsion fan blades 122A may pivot around a central rod 125 to change angle of attack. These rods in this case may retain the outer shroud. The root of fan blades 122A may be tapped to receive screws on either side of the central rod 125, and a number of appropriately located tapped holes would allow installing the blades at different angles.

Figure 25:
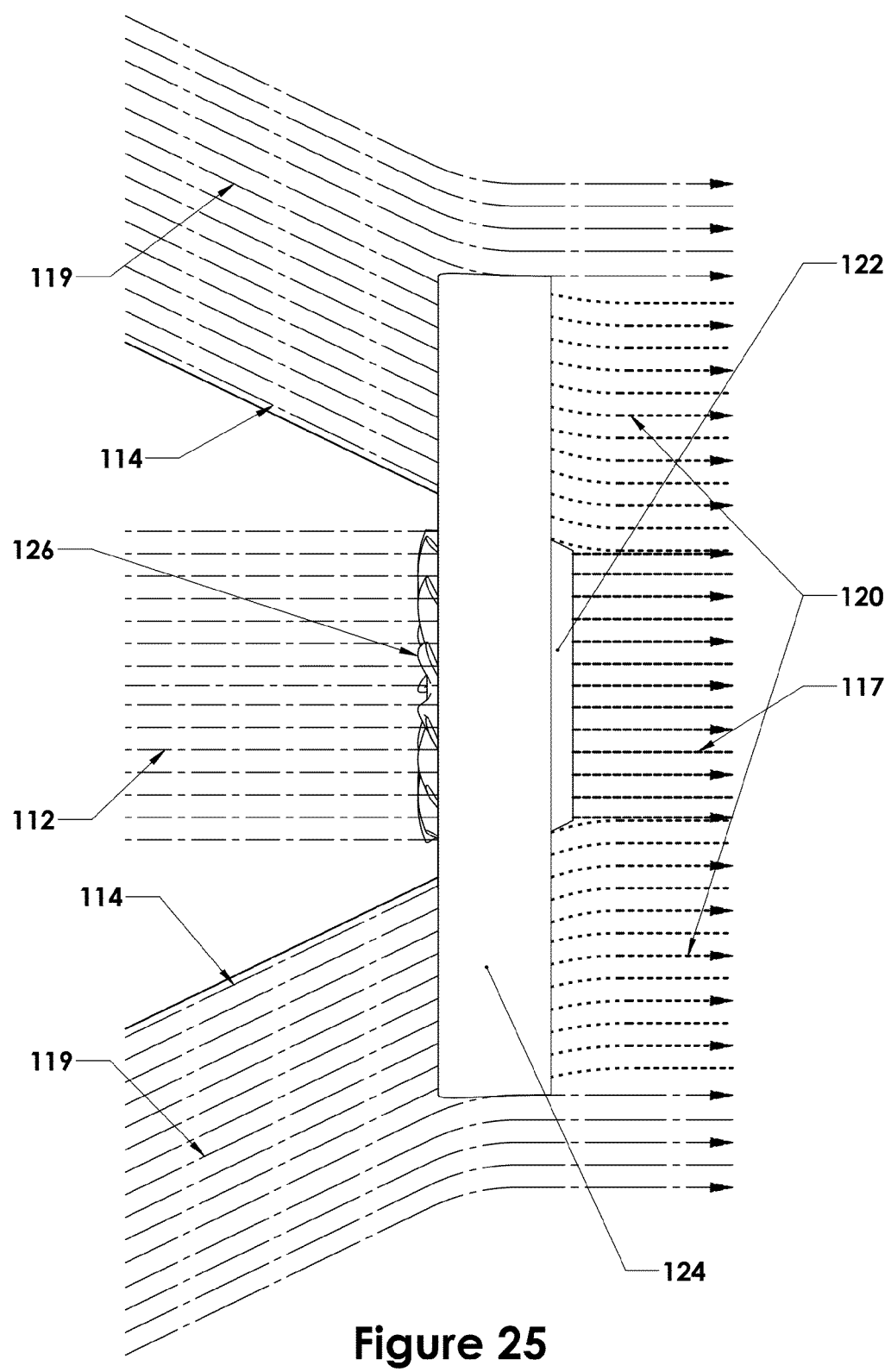
FIG. 25 is a side view of the ductless fan of the present invention, illustrating airflow through the center extraction fan and its augmentation effect on the ductless fan flow.

FIG. 25 is an enlarged side view of the ductless fan of the present invention, illustrating airflow through the ductless fan as well as the center extraction fan. This Figure illustrates how the inner extraction fan 126 pumps suctioned low energy air 112 through the hub, which entrains ductless fan flow 120. This pumping action and entrainment helps prevent turbulence that produces base drag.

Note that the present invention has been illustrated herein in a preferred embodiment contemplated at the time of filing, but that other combinations and permutations are also contemplated as being with in the spirit and scope of the present invention. For example, the present invention is described as a roadable aircraft, which may be registered as a three-wheeled motorcycle. However, a conventional (4 wheel) configuration is technically feasible and is not being ruled out, but might present more regulatory difficulties before being allowed on the road.

The various components of the invention (collapsible wing, ductless fan, extraction fan, and the like) may be used separately in an aircraft or other design. In addition, in the preferred embodiment, the extraction fan and ductless fan are shown used together. However, one may have a ductless fan without the hollow hub and extraction fan, but the extraction fan generally requires the hollow hub, although it could be used on a more conventional pusher propeller with a hollow hub.

While the preferred embodiment and various alternative embodiments of the invention have been disclosed and described in detail herein, it may be apparent to those skilled in the art that various changes in form and detail may be made therein without departing from the spirit and scope thereof.

I claim:

1. A collapsible wing for an aircraft, comprising:
   a single an elongated forward spar, the wing having only one spar;
   an aerodynamic fairing, attached to the single elongated forward spar, forming a leading edge of the collapsible wing;

a plurality of main wing ribs hingably attached to the single elongated forward spar, extendable from a folded position substantially parallel to the single elongated forward spar to an extended position substantially perpendicular to the single elongated forward spar; and a flexible wing skin, attached to the single elongated forward spar and the plurality of main wing ribs, covering the plurality of main wing ribs and stretched taut to form an aerodynamic surface for the collapsible wing when the plurality of main wing ribs are in the extended position, and folding with the plurality of main wing ribs when the plurality of main wing ribs are in the collapsed position to allow the collapsible wing to collapse for storage.

2. The collapsible wing of claim 1, wherein the flexible wing skin is formed as a sleeve wrapped around both the plurality of main wing ribs and.

3. A collapsible wing for an aircraft, comprising:

an elongated main forward spar attached to a leading edge fairing of the collapsible wing:

a plurality of main wing ribs hingably attached to the elongated main forward spar, extendable from a folded position substantially parallel to the elongated main forward spar to an extended position substantially perpendicular to the elongated main forward spar; and a flexible wing skin, attached to the plurality of main wing ribs, covering the plurality of main wing ribs and stretched taut to form an aerodynamic surface for the collapsible wing when the plurality of main wing ribs are in the extended position, and folding with the plurality of main wing ribs when the plurality of main wing ribs are in the collapsed position to allow the collapsible wing to collapse for storage;

at least one tensioning bladder adjacent the flexible wing skin and the elongated main forward spar, provided within the collapsible wing, such that when the plurality of main wing ribs are in the extended position, the at least one tensioning bladder is inflated to provide tension on the flexible wing skin to keep the flexible wing skin taut, wherein the flexible wing skin is formed as a tubular sleeve wrapped around the plurality of main wing ribs.

4. A collapsible wing for an aircraft, comprising:

an elongated main forward spar attached to a leading edge fairing of the collapsible wing;

a plurality of main wing ribs hingably attached to the elongated main forward spar, extendable from a folded position substantially parallel to the elongated main forward spar to an extended position substantially perpendicular to the elongated main forward spar;

a flexible wing skin, attached to the plurality of main wing ribs, covering the plurality of main wing ribs and stretched taut to form an aerodynamic surface for the collapsible wing when the plurality of main wing ribs are in the extended position, and folding with the plurality of main wing ribs when the plurality of main wing ribs are in the collapsed position to allow the collapsible wing to collapse for storage; and a cable or rope, attached to outboard ends of the plurality of main wing ribs so as to align the outboard ends of the plurality of main wing ribs when the plurality of main wing ribs are in the extended position and to provide a trailing edge for the collapsible wing.

5. A collapsible wing for an aircraft, comprising:

an elongated main forward spar attached to a leading edge fairing of the collapsible wing;

a plurality of main wing ribs hingably attached to the elongated main forward spar, extendable from a folded position substantially parallel to the elongated main forward spar to an extended position substantially perpendicular to the elongated main forward spar;

a flexible wing skin, attached to the plurality of main wing ribs, covering the plurality of main wing ribs and stretched taut to form an aerodynamic surface for the collapsible wing when the plurality of main wing ribs are in the extended position, and folding with the plurality of main wing ribs when the plurality of main wing ribs are in the collapsed position to allow the collapsible wing to collapse for storage; and a plurality of wing tip ribs each having different predetermined lengths, hingably attached to the elongated main forward spar, extendable from a folded position substantially parallel to the elongated main forward spar to an extended position at corresponding predetermined angles to the elongated main forward spar, the plurality of wing tip ribs having trailing ends defining a rounded wing tip for the collapsible wing.

6. An aircraft having a collapsible wing, comprising:

a fuselage, a pair of wings, each comprising:

a single elongated forward spar, pivotably attached to the fuselage and extendable from a folded position substantially parallel to the fuselage to an extended position substantially perpendicular to the fuselage; and attached to a leading edge fairing of the collapsible wing, the wing having only one spar;

a plurality of main wing ribs hingably attached to the single elongated forward spar, extendable from a folded position substantially parallel to the single elongated forward spar to an extended position substantially perpendicular to the single elongated forward spar; and a flexible wing skin, attached to the plurality of main wing ribs, covering the plurality of main wing ribs and stretched taut to form an aerodynamic surface for the collapsible wing when the plurality of main wing ribs are in the extended position, and folding with the plurality of main wing ribs when the plurality of main wing ribs are in the collapsed position to allow the collapsible wing to collapse for storage.

7. The aircraft having a collapsible wing of claim 6, wherein the flexible wing skin is formed as a sleeve wrapped around the plurality of main wing ribs.

8. An aircraft having a collapsible wing, comprising:

a fuselage, a pair of wings, each comprising:

an elongated main forward spar, pivotably attached to the fuselage and extendable from a folded position substantially parallel to the fuselage to an extended position substantially perpendicular to the fuselage; and attached to a leading edge fairing of the collapsible wing;

plurality of main wing ribs hingably attached to the elongated main forward spar extendable from a folded position substantially parallel to the elongated main forward spar to an extended position substantially perpendicular to the elongated main forward spar;

flexible wing skin, attached to the plurality of main wing ribs, covering the plurality of main wing ribs and stretched taut to form an aerodynamic surface for the collapsible wing when the plurality of main wing ribs are in the extended position, and folding with the plurality of main wing ribs when the plurality of main wing ribs are in the collapsed position to allow the collapsible wing to collapse for storage; and at least one tensioning bladder adjacent the flexible wing skin and the elongated main forward spar, provided within the collapsible wing, such that when the plurality of main wing ribs are in the extended position, the at least one tensioning bladder is inflated to provide tension on the flexible wing skin to keep the flexible wing skin taut, wherein the flexible wing skin is formed as a tubular sleeve wrapped around the plurality of main wing ribs.

9. An aircraft having a collapsible wing, comprising:
a fuselage, and
a pair of wings, each comprising:
an elongated main forward spar, pivotably attached to the fuselage and extendable from a folded position substantially parallel to the fuselage to an extended position substantially perpendicular to the fuselage; and attached to a leading edge fairing of the collapsible wing;
plurality of main wing ribs hingably attached to the elongated main forward spar, extendable from a folded position substantially parallel to the elongated main forward spar to an extended position substantially perpendicular to the elongated main forward spar;
flexible wing skin, attached to the plurality of main wing ribs, covering the plurality of main wing ribs and stretched taut to form an aerodynamic surface for the collapsible wing when the plurality of main wing ribs are in the extended position, and folding with the plurality of main wing ribs when the plurality of main wing ribs are in the collapsed position to allow the collapsible wing to collapse for storage; and
a cable or rope, attached to outboard ends of the plurality of main wing ribs so as to align the outboard ends of the plurality of main wing ribs when the plurality of main wing ribs are in the extended position and to provide a trailing edge for the collapsible wing.

10. An aircraft having a collapsible wing, comprising:
a fuselage,
a pair of wings, each comprising:
an elongated main forward spar, pivotably attached to the fuselage and extendable from a folded position substantially parallel to the fuselage to an extended position substantially perpendicular to the fuselage; and attached to a leading edge fairing of the collapsible wing;
plurality of main wing ribs hingably attached to the elongated main forward spar, extendable from a folded position substantially parallel to the elongated main forward spar to an extended position substantially perpendicular to the elongated main forward spar;
flexible wing skin, attached the plurality of main wing ribs, covering the plurality of main wing ribs and stretched taut to form an aerodynamic surface for the collapsible wing when the plurality of main wing ribs are in the extended position, and folding with the plurality of main wing ribs when the plurality of main wing ribs are in the collapsed position to allow the collapsible wing to collapse for storage; and
a plurality of wing tip ribs each having different predetermined lengths, hingably attached to the elongated main forward spar, extendable from a folded position substantially parallel to the elongated main forward spar to an extended position at corresponding predetermined angles to the elongated main forward spar, the plurality of wing tip ribs having trailing ends defining a rounded wing tip for the collapsible wing.

11. An aircraft having a collapsible wing, comprising:
a fuselage,
a pair of wings, each comprising:
an elongated main forward spar, pivotably attached to the fuselage and extendable from a folded position substantially parallel to the fuselage to an extended position substantially perpendicular to the fuselage; and attached to a leading edge fairing of the collapsible wing;
plurality of main wing ribs hingably attached to the elongated main forward spar, extendable from a folded position substantially parallel to the elongated main forward spar to an extended position substantially perpendicular to the elongated main forward spar;
a flexible wing skin, attached to the plurality of main wing ribs, covering the plurality of main wing ribs and stretched taut to form an aerodynamic surface for the collapsible wing when the plurality of main wing ribs are in the extended position, and folding with the plurality of main wing ribs when the plurality of main wing ribs are in the collapsed position to allow the collapsible wing to collapse for storage; and
a pair of tail booms extending aft from the fuselage and parallel to the fuselage, each of the pair of tail booms having a length equal to or greater than that of the elongate forward main spar of each of the pair of wings, such that then the elongated main forward spar of each of the pair of wings is placed in the folded position substantially parallel to the fuselage, each of the pair of wings is adjacent a corresponding one of the pair of tail booms so as to form a compact and aerodynamic packaging for each of pair of wings in the folded position.

12. The aircraft having a collapsible wing of claim 11, further comprising:
a ductless fan mounted to a rear portion of the fuselage, the ductless fan propelling the aircraft in the air, the ductless fan comprising:
a plurality of blades having inward end portions mounted to a central hub and radiating outward from the central hub,
a shroud integral to the ductless fan, the shroud comprising a substantially circular ring attached to outward end portions of the plurality of blades.

13. The aircraft of claim 12, wherein the ductless fan further comprises:
a center-mounted extraction fan mounted in the central hub, the center-mounted extraction fan ducted to inlets along the fuselage to draw air into the fuselage and thus prevent boundary layer separation.

14. An aircraft having a collapsible wing, comprising:
a fuselage,
a pair of wings, each comprising:
an elongated main forward spar, pivotably attached to the fuselage and extendable from a folded position substantially parallel to the fuselage to an extended position substantially perpendicular to the fuselage; and attached to a leading edge fairing of the collapsible wing;
plurality of main wing ribs hingably attached to the elongated main forward spar, extendable from a folded position substantially parallel to the elongated main forward spar to an extended position substantially perpendicular to the elongated main forward spar;

a flexible wing skin, attached to the plurality of main wing ribs, covering the plurality of main wing ribs and stretched taut to form an aerodynamic surface for the collapsible wing when the plurality of main wing ribs are in the extended position, and folding with the plurality of main wing ribs when the plurality of main wing ribs are in the collapsed position to allow the collapsible wing to collapse for storage; and a ductless fan mounted to a rear portion of the fuselage, the ductless fan propelling the aircraft in the air, the ductless fan comprising:

a plurality of blades having inward end portions mounted to a central hub and radiating outward from the central hub, a shroud integral to the ductless fan, the shroud comprising a substantially circular ring attached to outward end portions of the plurality of blades.

15. The aircraft having a collapsible wing of claim 14, wherein the ductless fan further comprises:
a center-mounted extraction fan mounted in the central hub, the center-mounted extraction fan ducted to inlets along the fuselage to draw air into the fuselage and thus prevent boundary layer separation.

16. An aircraft, comprising:
a fuselage; and
a pair of wings, each comprising:
an elongated main forward spar, pivotably attached to the fuselage and extendable from a folded position substantially parallel to the fuselage to an extended position substantially perpendicular to the fuselage; and attached to a leading edge fairing of the collapsible wing;

a plurality of main wing ribs hingably attached to the elongated main forward spar, extendable from a folded position substantially parallel to the elongated main forward spar to an extended position substantially perpendicular to the elongated main forward spar; and a flexible wing skin, attached to the plurality of main wing ribs, covering the plurality of main wing ribs and stretched taut to form an aerodynamic surface for the collapsible wing when the plurality of main wing ribs are in the extended position, and folding with the plurality of main wing ribs when the plurality of main wing ribs are in the collapsed position to allow the collapsible wing to collapse for storage, at least one tensioning bladder adjacent the flexible wing skin and the elongated main forward spar, provided within the collapsible wing, such that when the plurality of main wing ribs are in the extended position, the at least one tensioning bladder is inflated to provide tension on the flexible wing skin to keep the flexible wing skin taut, a ductless fan mounted to a rear portion of the fuselage, the ductless fan propelling the aircraft in the air, the ductless fan comprising:

a plurality of blades having inward end portions mounted to a central hub and radiating outward from the central hub, a shroud integral to the ductless fan, the shroud comprising a substantially circular ring attached to outward end portions of the plurality of blades.

17. The aircraft of claim 16, wherein the flexible wing skin is formed as a tubular sleeve wrapped around the plurality of main wing ribs.

18. The aircraft of claim 16, further comprising:
a cable or rope, attached to outboard ends of the plurality of main wing ribs so as to align the outboard ends of the plurality of main wing ribs when the plurality of main wing ribs are in the extended position and to provide a trailing edge for the collapsible wing.

19. The aircraft of claim 16, further comprising:
a plurality of wing tip ribs each having different predetermined lengths, hingably attached to the elongated main forward spar, extendable from a folded position substantially parallel to the elongated main forward spar to an extended position at corresponding predetermined angles to the elongated main forward spar, the plurality of wing tip ribs having trailing ends defining a rounded wing tip for the collapsible wing.

20. The aircraft of claim 16, further comprising:
a pair of tail booms extending aft from the fuselage and parallel to the fuselage, each of the pair of tail booms having a length equal to or greater than that of the elongate forward main spar of each of the pair of wings, such that then the elongated main forward spar of each of the pair of wings is placed in the a folded position substantially parallel to the fuselage, each of the pair of wings is adjacent a corresponding one of the pair of tail booms so as to form a compact and aerodynamic packaging for each of the pair of wings in the folded position.

* * * * *